(12) United States Patent
Ko et al.

(10) Patent No.: US 9,768,849 B2
(45) Date of Patent: Sep. 19, 2017

(54) METHOD AND APPARATUS FOR REPORTING CHANNEL STATUS INFORMATION IN WIRELESS COMMUNICATION SYSTEM

(71) Applicant: LG ELECTRONICS INC., Seoul (KR)

(72) Inventors: Hyunsoo Ko, Seoul (KR); Jinmin Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/781,811

(22) PCT Filed: Apr. 2, 2014

(86) PCT No.: PCT/KR2014/002839
§ 371 (c)(1),
(2) Date: Oct. 1, 2015

(87) PCT Pub. No.: WO2014/163397
PCT Pub. Date: Oct. 9, 2014

(65) Prior Publication Data
US 2016/0050003 A1 Feb. 18, 2016

Related U.S. Application Data

(60) Provisional application No. 61/808,220, filed on Apr. 4, 2013.

(51) Int. Cl.
*H04B 7/06* (2006.01)
*H04B 7/0417* (2017.01)
*H04B 7/04* (2017.01)

(52) U.S. Cl.
CPC ......... *H04B 7/0626* (2013.01); *H04B 7/0417* (2013.01); *H04B 7/0469* (2013.01); *H04B 7/0478* (2013.01)

(58) Field of Classification Search
CPC .... H04B 7/0626; H04B 17/24; H04B 17/309; H04B 17/318; H04B 7/0417;
(Continued)

(56) References Cited

U.S. PATENT DOCUMENTS 8,934,566 B1 * 1/2015 Gao .................. H04L 25/0242
370/203
2010/0046412 A1 2/2010 Varadarajan et al.
(Continued)

FOREIGN PATENT DOCUMENTS

JP 2012-054885 3/2012
WO 2013/024350 2/2013

OTHER PUBLICATIONS

PCT International Application No. PCT/KR2014/002839, Written Opinion of the International Searching Authority dated Jun. 26, 2014, 16 pages.

*Primary Examiner* — Mohamed Kamara
(74) *Attorney, Agent, or Firm* — Lee Hong Degerman Kang & Waimey

(57) ABSTRACT

The present invention relates to a wireless communication system and, more specifically, to a method and an apparatus for reporting channel status information (CSI). Particularly, the method by which a terminal in the wireless communication system reports the CSI, comprises the steps of: receiving a reference signal from a base station; and reporting, to the base station, the CSI generated by using the reference signal, wherein the CSI includes channel information for a plurality of antenna ports mapped according to a first parameter, and the first parameter is a value related to vertical domain antenna ports indicated through upper layer signaling.

7 Claims, 25 Drawing Sheets

(a)

(b)

(58) Field of Classification Search
CPC .. H04B 7/0469; H04B 7/0478; H04B 7/0619; H04B 7/068; H04L 5/0057; H04L 1/0026; H04L 1/0027; H04L 1/0029; H04L 25/0204
See application file for complete search history.

(56) References Cited

U.S. PATENT DOCUMENTS

| | | |
|---|---|---|
| 2012/0213111 A1 | 8/2012 | Shimezawa et al. |
| 2013/0272151 A1* | 10/2013 | Thomas ................ H04W 24/02 370/252 |
| 2014/0016681 A1* | 1/2014 | Muruganathan ..... H04B 7/0671 375/219 |
| 2014/0098689 A1* | 4/2014 | Lee ...................... H04B 7/0469 370/252 |
| 2014/0192762 A1* | 7/2014 | Li .................... H04L 25/03929 370/329 |

* cited by examiner

FIG. 5
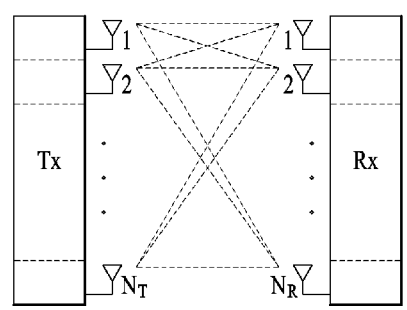
(a)
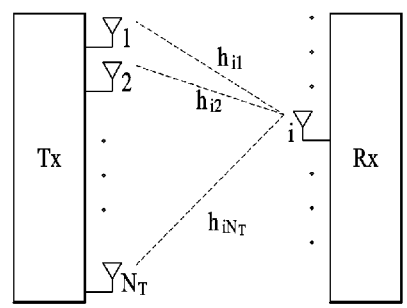
(b)

(a)                    (b)

FIG. 18
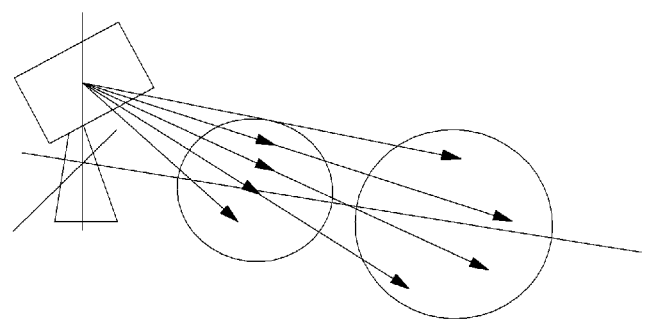
(a)
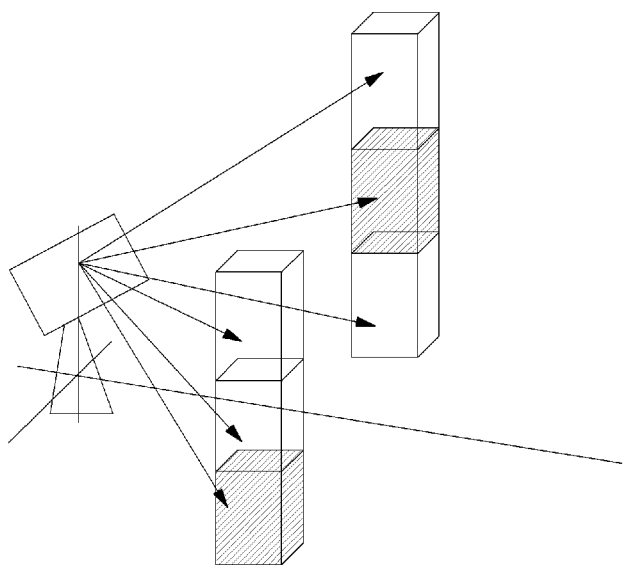
(b)

FIG. 19
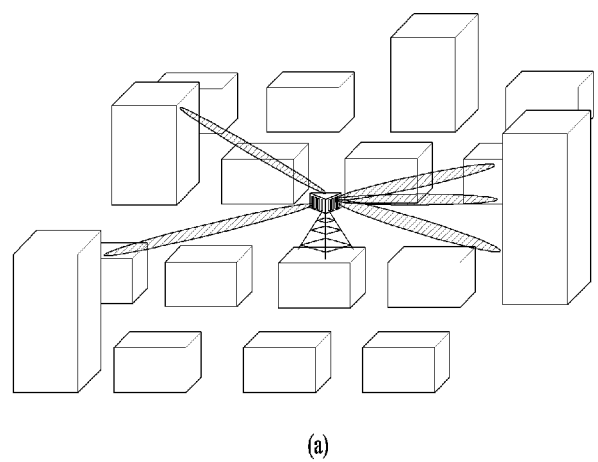
(a)
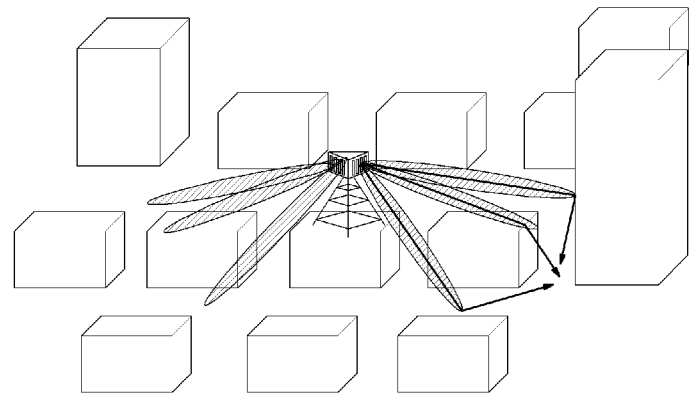
(b)

8Tx (H) - 1 ports (V)

8Tx (H) - 2 ports (V)

8Tx (H) - 4 ports (V)

8Tx (H) - 1 ports (V)

0  1  2  3  4  5  6  7

8Tx (H) - 2 ports (V)

8Tx (H) - 4 ports (V)

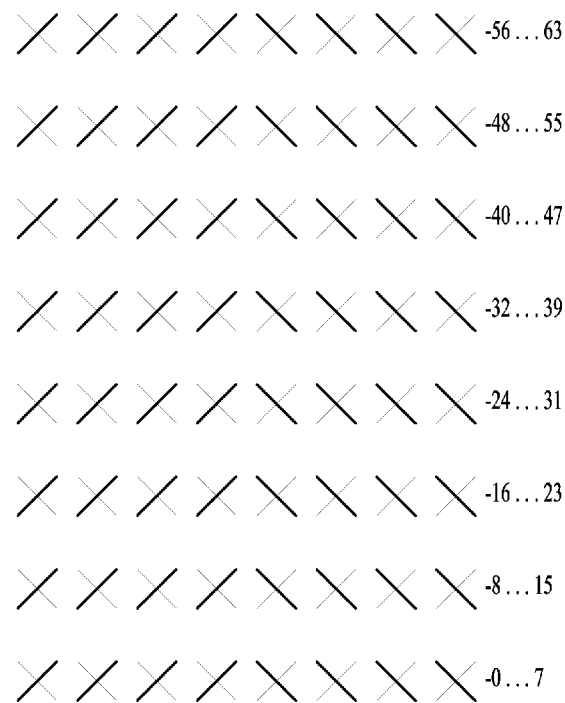

8Tx (H) - 1 ports (V)

0 1 2 3 4 5 6 7

16Tx (H) - 2 ports (V)

8 9 10 11 12 13 14 15

0 1 2 3 4 5 6 7

32Tx (H) - 4 ports (V)

-24 ... 31

-16 ... 23

-8 ... 15

-0 ... 7

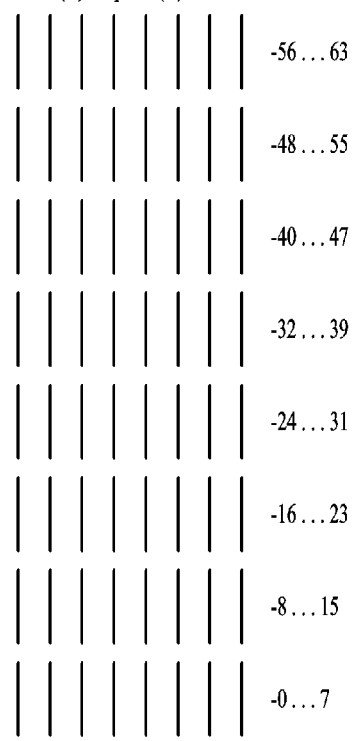

8Tx (H) - 1 ports (V)

0  1  2  3  4  5  6  7

16Tx (H) - 2 ports (V)

8  9  10  11  12  13  14  15

0  1  2  3  4  5  6  7

32Tx (H) - 4 ports (V)

METHOD AND APPARATUS FOR REPORTING CHANNEL STATUS INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/002839, filed on Apr. 2, 2014, which claims the benefit of U.S. Provisional Application No. 61/808,220, filed on Apr. 4, 2013, the contents of which are all hereby incorporated by reference herein in their entirety.

TECHNICAL FIELD

The present invention relates to a wireless communication system, and more particularly, to a method and apparatus for reporting channel state information.

BACKGROUND ART

Multi-Input Multi-Output (MIMO) technology is to improve efficiency in data transmission and reception by using multiple transmitting antennas and multiple receiving antennas instead of a single transmitting antenna and a single receiving antenna. If a single antenna is used, a receiver receives data through a single antenna path. However, if multiple antennas are used, the receiver receives data through various paths. Accordingly, speed and amount in data transmission may be increased, and coverage may be increased.

In order to increase multiplexing gain of MIMO operation, channel status information (CSI) may be fed back from a MIMO receiver to a MIMO transmitter. The receiver may determine CSI by performing channel measurement through a predetermined reference signal (RS) from the transmitter.

DISCLOSURE

Technical Problem

An object of the present invention devised to solve the problem lies in a method for generating and reporting channel state information (CSI) for accurately and effectively supporting a two-dimensional (2D) antenna structure.

It is to be understood that both the foregoing general description and the following detailed description of the present invention are exemplary and explanatory and are intended to provide further explanation of the invention as claimed.

Technical Solution

The object of the present invention can be achieved by providing a method for reporting channel state information (CSI) by a user equipment (UE) in a wireless communication system, the method including receiving a reference signal from a base station (BS), and reporting the CSI generated using the reference signal to the BS, wherein the CSI includes channel information about a plurality of antenna ports mapped according to a first parameter, and the first parameter is a value about vertical domain antenna ports indicated via upper layer signaling.

The first parameter may be semi-statically received.

The number of predefined horizontal domain antenna ports and an antenna port number determined by the first parameter may be sequentially mapped to the plurality of antenna ports.

The plurality of antenna ports may be configured in such a way that an antenna port number is mapped to a horizontal domain antenna port and then an antenna port number is mapped to a vertical domain antenna port.

The plurality of antenna ports may be configured in such a way that an antenna port number is completely mapped to a first pole of antenna port and then an antenna port number is mapped to a second pole of antenna port. In addition, the first pole of antenna port and the second pole of antenna port may be configured to be orthogonal to each other.

The method may further include receiving a command for a second parameter via upper layer signaling, wherein the second parameter may be a total number of all antenna ports. In addition, antenna port numbers determined by the first parameter and the second parameter may be sequentially mapped to the plurality of antenna ports.

The first parameter may be 2 or more.

In another aspect of the present invention, provided herein is a user equipment (UE) for reporting channel state information (CSI) of a wireless communication system, the UE including a radio frequency unit, and a processor, wherein the processor is configured to receive a reference signal from a base station (BS) and to report the CSI generated using the reference signal to the BS, the CSI includes channel information about a plurality of antenna ports mapped according to a first parameter, and the first parameter is a value about vertical domain antenna ports indicated via upper layer signaling.

It is to be understood that both the foregoing general description and the following detailed description of the present invention are exemplary and explanatory and are intended to provide further explanation of the invention as claimed.

Advantageous Effects

The present invention provide a new method for generating and reporting channel state information (CSI) for accurately and effectively supporting a two-dimensional (2D) antenna structure.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates the configuration of a MIMO wireless communication system;

FIG. 18 is a diagram illustrating examples of beamforming according to a 2D antenna configuration;

FIG. 19 is a diagram for explanation of examples of vertical beamforming;

BEST MODE

Figure 1:
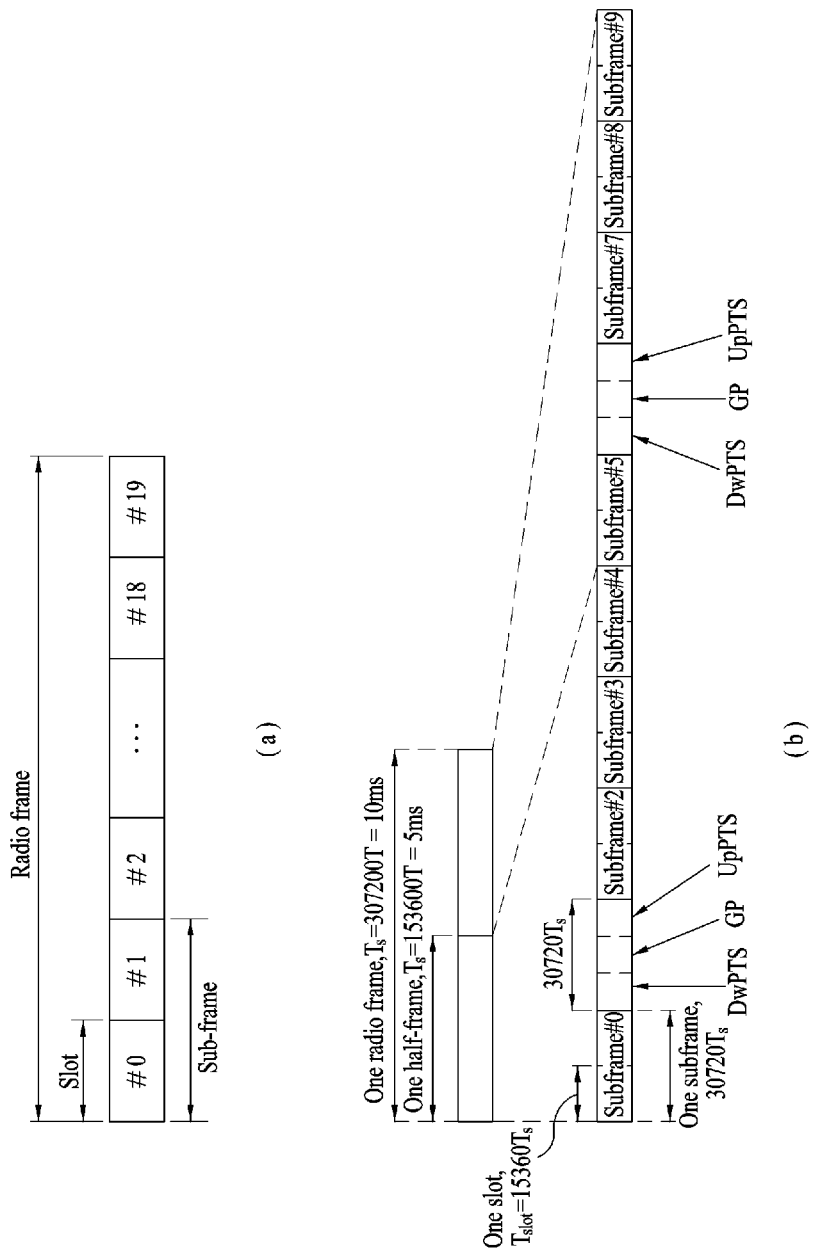
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
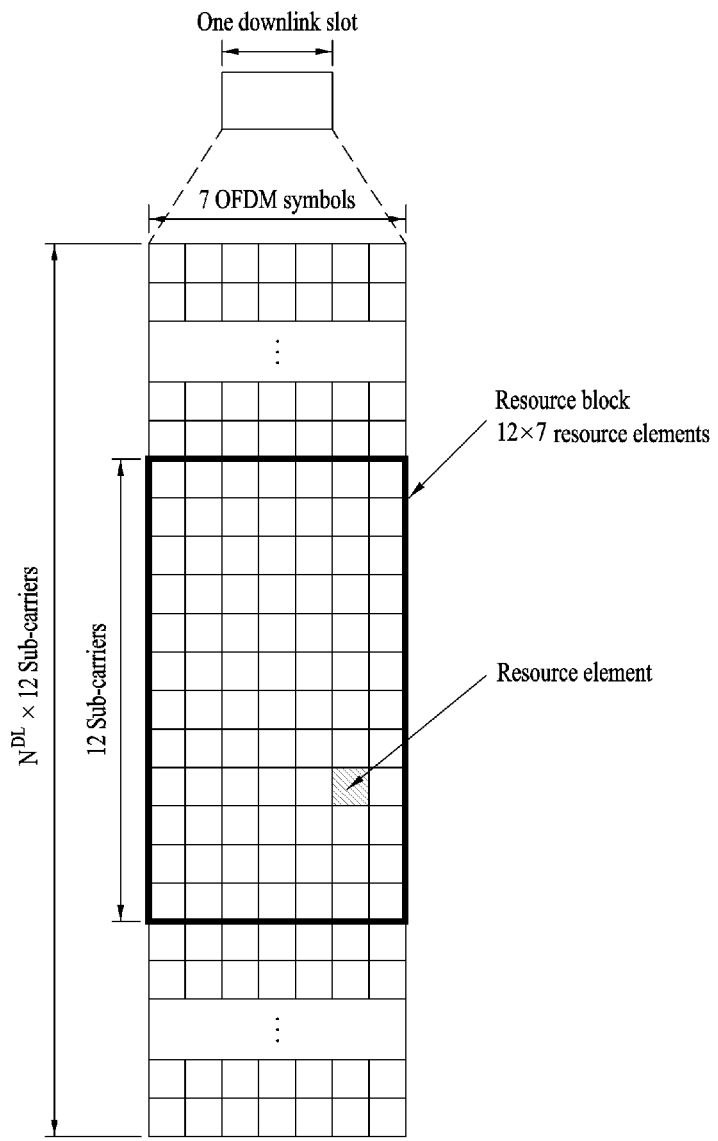
FIG. 2 is a diagram illustrating a resource grid at a downlink slot.

FIG. 2 is a diagram illustrating a resource grid at a downlink slot.

One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number NDL of resource blocks (RBs) included in the downlink slot depends on a downlink transmission bandwidth. A structure of an uplink slot may be the same as that of the downlink slot.

Figure 3:
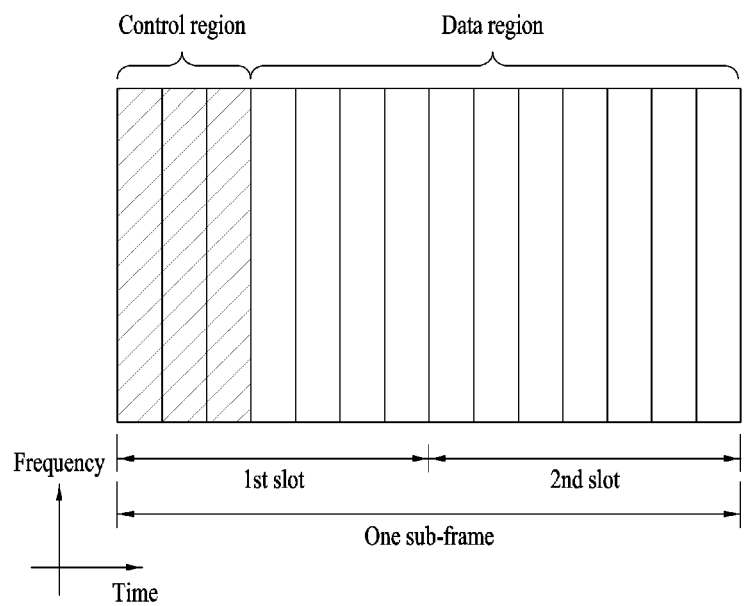
FIG. 3 is a diagram illustrating a structure of a downlink subframe.

FIG. 3 is a diagram illustrating a structure of a downlink subframe.

Maximum three OFDM symbols located at the front of the first slot within one subframe correspond to a control region to which a control channel is allocated. The other OFDM symbols correspond to a data region to which a physical downlink shared channel (PDSCH) is allocated.

Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control commands of an individual user equipment within a random user equipment group, transmission power control information, and activation of voice over Internet protocol (VoIP). A plurality of PDCCHs may be transmitted within the control region, and the user equipment may monitor the plurality of PDCCHs.

The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE.

The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
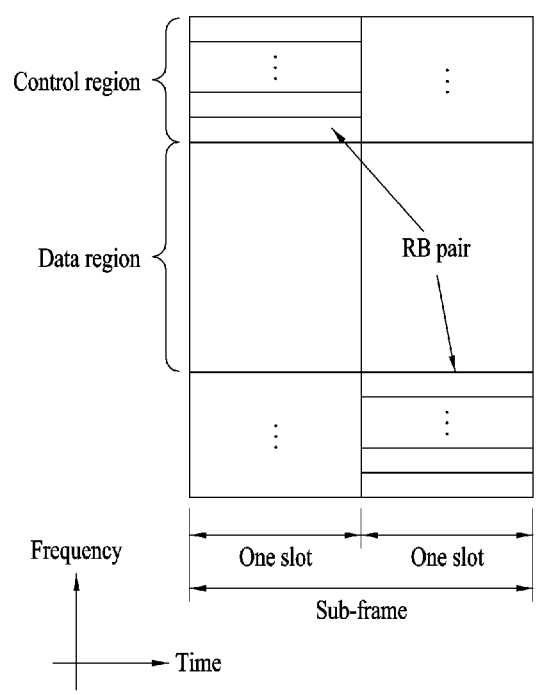
FIG. 4 is a diagram illustrating a structure of an uplink subframe.

FIG. 4 is a diagram illustrating a structure of an uplink subframe.

The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Modeling of Multiple Input Multiple Output (MIMO) System

FIG. 5 illustrates the configuration of a MIMO wireless communication system.

Referring to FIG. 5(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to use of a plurality of antennas at only one of the transmitter and the receiver. Therefore, transmission rate and frequency efficiency can be remarkably increased. Along with the increase of channel transmission capacity, the transmission rate may be increased in theory to the product of a maximum transmission rate $R_o$ that may be achieved by means of a single antenna and a rate increase rate $R_i$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was proved in the mid 1990's, many techniques have been actively studied to increase data rate in real implementation. Some of the techniques have already been reflected in various wireless communication standards including standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas will be described in detail through mathematical modeling.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector may be given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{s}$ may be expressed as follows, using a diagonal matrix $P$ of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix $W$. The weight matrix $W$ functions to appropriately distribute the transmission information to the respective Tx antennas according to transmission channel states, etc. These $N_T$ transmission signals $x_1, x_2, \ldots, x_{N_T}$ are represented as a vector $x$, which may be determined as $$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

Here, $w_{ij}$ denotes a weight between an $i^{th}$ Tx antenna and a $j^{th}$ piece of information. $W$ may be referred to as a precoding matrix.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO wireless communication system, they may be distinguished by the indexes of Tx and Rx antennas. A channel between a $j^{th}$ Tx antenna and an $i^{th}$ Rx antenna is denoted by $h_{ij}$. The index of an Rx antenna precedes the index of a Tx antenna in $h_{ij}$.

FIG. 5(b) illustrates channels from $N_T$ Tx antennas to an $i^{th}$ Rx antenna. The channels may be collectively represented as a vector or a matrix. In FIG. 5(b), the channels from the $N_T$ Tx antennas to the $i^{th}$ Rx antenna may be expressed as [Equation 7].

$$h_i^T = [h_{i1}, h_{i2}, \ldots, h_{iN_T}] \quad \text{[Equation 7]}$$

Hence, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

Actual channels experience the above channel matrix $H$ and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above mathematical modeling, the received signal vector is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$
$$= Hx + n$$

[Equation 10]

The numbers of rows and columns in the channel matrix H representing channel states are determined according to the numbers of Rx antennas and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is of size $N_R \times N_T$.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \quad \text{[Equation 11]}$$

The rank of a matrix may also be defined as the number of non-zero eigenvalues, when the matrix is decomposed by Eigen Value Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

In the present disclosure, the 'rank' of MIMO transmission is the number of paths in which signals can be transmitted independently at a specific time in specific frequency resources, and the 'number of layers' is the number of signal streams transmitted in the respective paths. In general, since a transmitter transmits as many layers as the rank of signal transmission, the rank and the number of layers are used in the same meaning, unless otherwise mentioned.

Reference Signal (RS)

In a wireless communication system, a packet is transmitted on a radio channel. In view of the nature of the radio channel, the packet may be distorted during transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion degree of the signal received on the radio channel. This signal is called a pilot signal or an RS.

In the case of data transmission and reception through multiple antennas, knowledge of channel states between Tx antennas and Rx antennas is required for successful signal reception. Accordingly, an RS should exist for each Tx antenna.

In a mobile communication system, RSs are largely categorized into two types according to the purposes that they serve, RSs used for acquisition of channel information and RSs used for data demodulation. The former-type RSs should be transmitted in a wideband to enable UEs to acquire downlink channel information. Even UEs that do not receive downlink data in a specific subframe should be able to receive such RSs and measure them. When an eNB transmits downlink data, it transmits the latter-type RSs in resources allocated to the downlink data. A UE can perform channel estimation by receiving the RSs and thus demodulate data based on the channel estimation. These RSs should be transmitted in a data transmission region.

In the legacy 3GPP LTE system (e.g. one conforming to 3GPP LTE Release-8), two types of downlink RSs are defined for unicast service, Common RS (CRS) and Dedicated RS (DRS). CRS is used for CSI acquisition and measurement, for example, for handover. The CRS is also called a cell-specific RS. DRS is used for data demodulation, called a UE-specific RS. The legacy 3GPP LTE system uses the DRS only for data demodulation and the CRS for the two purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
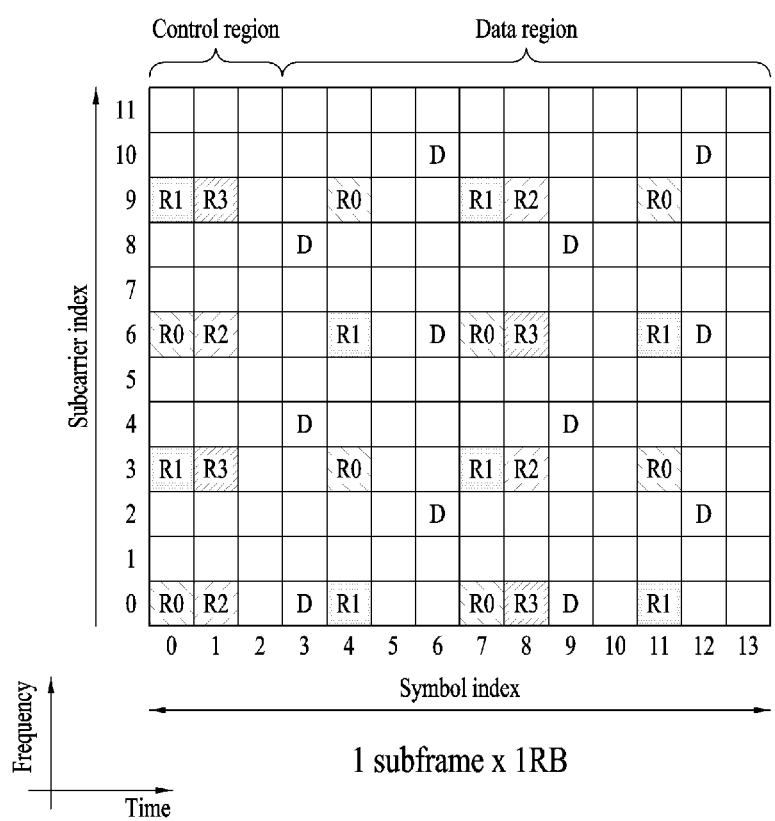
FIG. 6 illustrates an exemplary CRS and DRS pattern for an RB pair.

FIG. 6 illustrates an exemplary CRS and DRS pattern for an RB pair.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. In FIG. 6, REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for four to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is Demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
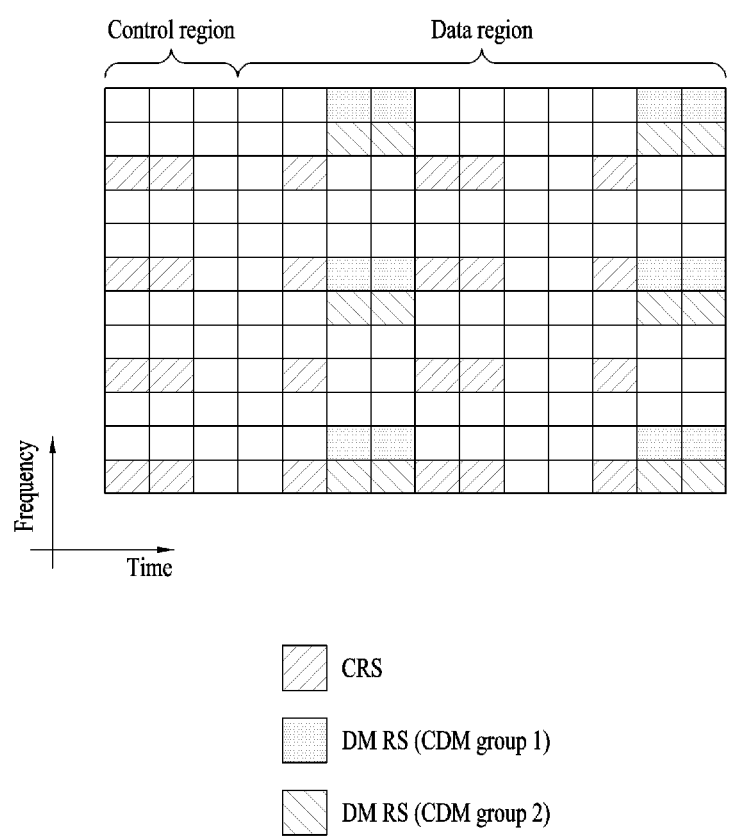
FIG. 7 illustrates an exemplary DM RS pattern defined for the LTE-A system.

FIG. 7 illustrates an exemplary DM RS pattern defined for the LTE-A system.

In FIG. 7, the positions of REs carrying DM RSs in an RB carrying downlink data (an RB having 14 OFDM symbols in time by 12 subcarriers in frequency in case of a normal CP) are marked. DMRSs may be transmitted for additionally defined four antenna ports (antenna port 7 to antenna port 10) in the LTE-A system. DM RSs for different antenna ports may be identified by their different frequency resources (subcarriers) and/or different time resources (OFDM symbols) (That is, the DM RSs may be multiplexed in Frequency Division Multiplexing (FDM) and/or Time Division Multiplexing (TDM)). In addition, if DM RSs for different antenna ports are positioned in the same time-frequency resources, they may be identified by their different orthogonal codes (That is, these DM RSs may be multiplexed in Code Division Multiplexing (CDM)). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes in the example of FIG. 7.

When an eNB transmits a DMRS, the same precoding as precoding applied to data may be applied to the DMRS. Accordingly, channel information estimated using a DMRS (or a UE-specific RS) by a UE may be precoded channel information. The UE may easily demodulate data using the channel information precoded through the DMRS. However, the UE cannot know the precoding information applied to the DMRS, and thus cannot acquire non-precoded channel information from the DMRS. The UE may acquire a separate RS other than the DMRS, that is, the non-precoded channel information using the aforementioned CSI-RS.

Figure 8:
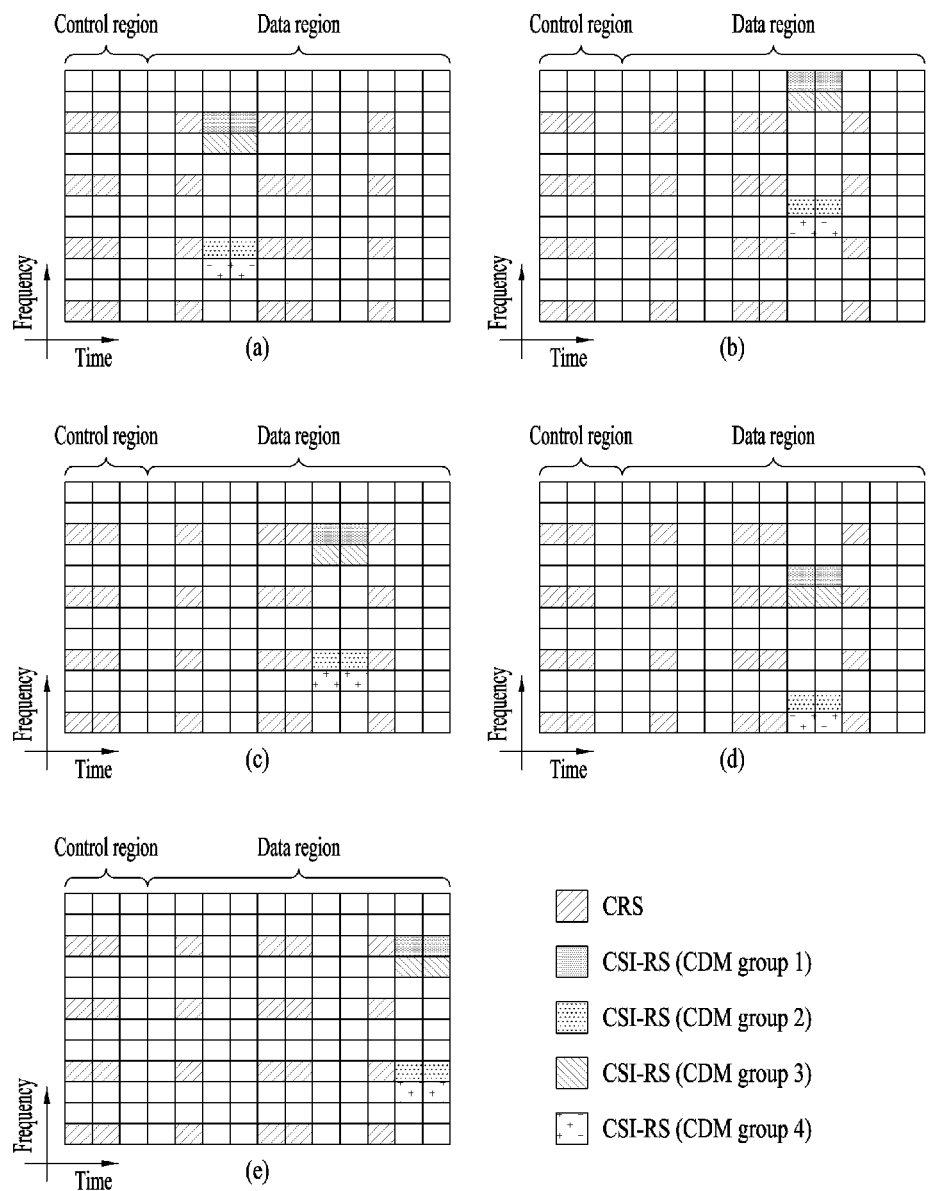
FIG. 8 illustrates exemplary CSI-RS patterns defined for the LTE-A system.

FIG. 8 illustrates exemplary CSI-RS patterns defined for the LTE-A system.

In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

The RS patterns illustrated in FIGS. 6, 7 and 8 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

CSI-RS Configuration

In the LTE-A system supporting up to eight downlink Tx antennas, an eNB should transmit CSI-RSs for all the antenna ports, as described before. Because transmission of CSI-RSs for up to eight Tx antenna ports in every subframe leads to too much overhead, the CSI-RSs should be transmitted intermittently along the time axis to thereby reduce CSI-RS overhead. Therefore, the CSI-RSs may be transmitted periodically at every integer multiple of one subframe, or in a predetermined transmission pattern.

The CSI-RS transmission period or pattern of the CSI-RSs may be configured by the eNB. To measure the CSI-RSs, a UE should have knowledge of a CSI-RS configuration that has been set for CSI-RS antenna ports in its serving cell (or a TP). The CSI-RS configuration may specify the index of a downlink subframe carrying CSI-RSs, the time-frequency positions of CSI-RS REs in the downlink subframe (e.g. a CSI-RS pattern as illustrated in FIGS. 8(a) to 8(e)), a CSI-RS sequence (a sequence used for CSI-RSs, generated pseudo-randomly based on a slot number, a cell ID, a CP length, etc. according to a predetermined rule), etc. That is, a given eNB may use a plurality of CSI-RS configurations and may indicate a CSI-RS configuration selected for use from among the plurality of CSI-RS configurations to a UE (UEs) in its cell.

The plurality of CSI-RS configurations may or may not include one CSI-RS configuration that the UE assumes that transmission power of CSI-RS is non-zero. In addition, the plurality of CSI-RS configurations may or may not include one or more CSI-RS configurations that the UE assumes that transmission power of CSI-RS is zero.

Each bit of a parameter (e.g., a 16-bit bitmap ZeroPowerCSI-RS parameter) for a CSI-RS configuration of transmission power of 0 may correspond to a CSI-RS configuration (or REs to which a CSI-RS can be allocated according to the CSI-RS configuration) via an upper layer, and the UE may assume that transmission power in CSI-RS REs of the CSI-RS configuration corresponding to a bit configured as 1 in the corresponding parameter is 0.

To identify a CSI-RS for each antenna port, resources carrying the CSI-RS for the antenna port should be orthogonal to resources carrying CSI-RSs for other antenna ports. As described before with reference to FIG. 8, CSI-RSs for different antenna ports may be multiplexed in FDM using orthogonal frequency resources, in TDM using orthogonal time resources, and/or in CDM using orthogonal code resources.

When notifying UEs within the cell of CSI-RS information (i.e. a CSI-RS configuration), the eNB should first transmit to the UEs information about time-frequency resources to which a CSI-RS for each antenna port is mapped. To be more specific, the time information may include the number of a subframe carrying CSI-RSs, a CSI-RS transmission period, a CSI-RS transmission subframe offset, and the number of an OFDM symbol carrying CSI-RS REs for an antenna. The frequency information may include frequency spacing between CSI-RS REs for an antenna and a CSI-RS RE offset or shift value along the frequency axis.

Figure 9:
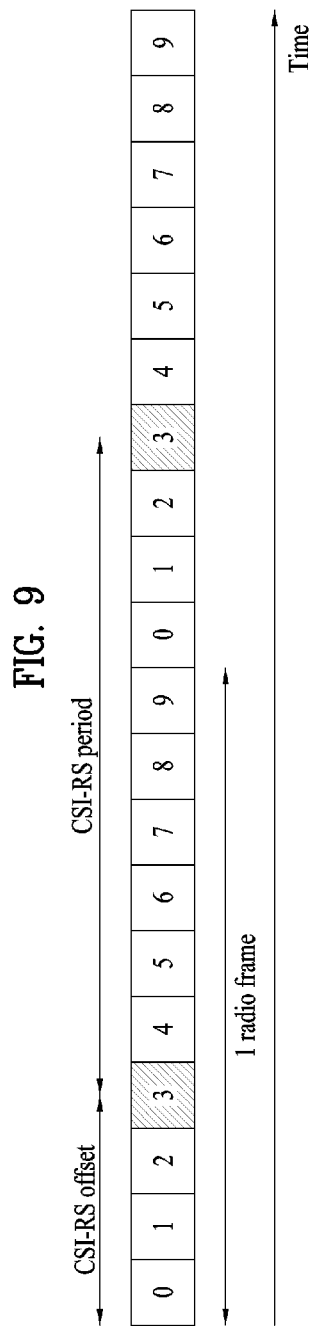
FIG. 9 illustrates an exemplary periodic CSI-RS transmission.

FIG. 9 illustrates an exemplary periodic CSI-RS transmission.

A CSI-RS may be transmitted periodically at every integer multiple of one subframe (e.g. in every 5, 10, 20, 40 or 80 subframes).

FIG. 9 illustrates the case in which one radio frame is divided into 10 subframes (subframe 0 to subframe 9). In FIG. 9, eNB transmits a CSI-RS with a CSI-RS transmission period of 10 ms (i.e. in every 10 subframes) and a CSI-RS transmission offset of 3, by way of example. Different eNBs may have different CSI-RS transmission offsets so that CSI-RSs transmitted from a plurality of cells are uniformly distributed in time. If a CSI-RS is transmitted every 10 ms, its CSI-RS transmission offset may be one of 0 to 9. Likewise, if the CSI-RS is transmitted every 5 ms, the CSI-RS transmission offset may be one of 0 to 4. If the CSI-RS is transmitted every 20 ms, the CSI-RS transmission offset may be one of 0 to 19. If the CSI-RS is transmitted every 40 ms, the CSI-RS transmission offset may be one of 0 to 39. If the CSI-RS is transmitted every 80 ms, the CSI-RS transmission offset may be one of 0 to 79. A CSI-RS transmission offset indicates a subframe in which an eNB starts CSI-RS transmission in every predetermined period. When the eNB signals a CSI-RS transmission period and offset to a UE, the UE may receive a CSI-RS from the eNB in subframes determined by the CSI-RS transmission period and offset. The UE may measure a channel using the received CSI-RS and thus may report such information as a Channel Quality Indicator (CQI), a PMI, and/or a Rank Indicator (RI) to the eNB. Unless a CQI, a PMI and an RI are separately described herein, they may be collectively referred to as a CQI (or CSI). The above information related to the CSI-RS is cell-specific information common to UEs within the cell. A CSI-RS transmission period and offset may be set separately for each individual CSI-RS configuration. For example, CSI-RS transmission periods and offsets may be separately set for a CSI-RS configuration for CSI-RSs transmitted with zero transmission power and a CSI-RS configuration for CSI-RSs transmitted with non-zero transmission power, as described later.

Compared to a CRS transmitted in all subframes for transmission of a PDSCH, the CSI-RS may be configured to be transmitted only in some subframes. For example, CSI subframe sets $C_{CSI,0}$ and $C_{CSI,1}$ may be set via an upper layer. A CSI reference resource (that is, a predetermined resourced region as a reference as CSI calculation) may belong to one of $C_{CSI,0}$ and $C_{CSI,1}$ and may not simultaneously belong to both $C_{CSI,0}$ and $C_{CSI,1}$. Accordingly, when the CSI subframe sets $C_{CSI,0}$ and $C_{CSI,1}$ are configured via the upper layer, the UE may not expect to receive trigger (a command for CSI calculation) for a CSI reference resource present in a subframe that does not belong to any CSI subframe set.

In addition, the CSI reference resource may be configured on a valid DL subframe. The valid DL subframe may be set as a subframe that satisfies various requirements. One of the requirements may be a subframe that belongs to a CSI subframe set linked to periodic CSI reporting when a CSI subframe set is configured for a UE in the case of the periodic CSI reporting.

In addition, in the CSI reference resource, the UE may derive a CSI index in consideration of the following assumptions (refer to 3GPP TS 36.213 for detail):

First three OFDM symbols of one subframe are occupied by control signaling.

There is not resource element used by a primary synchronization signal, a secondary synchronization signal, or a physical broadcast channel (PBCH).

CP length of non-multicast broadcast single frequency network (MBSFN) subframe

Redundancy version is 0.

When a CSI-RS is used for channel measurement, a ratio of CSI-RS EPRE to energy per resource element (PDSCH EPRE) may be determined according to a predetermined rule.

In the case of CSI reporting in transmission mode 9 (that is, a mode for supporting up to 8-layer transmission), when PMI/RI reporting is configured for the UE, it is assumed that DMRS overhead corresponds to most recently reported rank (e.g., as described with reference to FIG. 7, DMRS overhead on one resource block pair is 12 REs in the case of two or more antenna ports (i.e., rank 2 or less) but is 24 REs in the case of three or more antenna ports (i.e., rank 3 or more), and thus a CQI index may be calculated under the assumption of DMRS overhead corresponding to the most recently reported rank value.).

An RE is not allocated to CSI-RS and 0-power CSI-RS.

An RE is not allocated to positioning RS (PRS).

A PDSCH transmission scheme follows a transmission mode (which may be a default mode) that is currently configured for a UE.

A ratio of a cell-specific RS EPRE to DSCH EPRE may be determined according to a predetermined rule.

The CSI-RS configuration may be signaled to the UE by the eNB via, for example, radio resource control (RRC) signaling. That is, information about the CSI-RS configuration may be provided to each UE in a cell via dedicated RRC signaling. For example, while the UE establishes connection with an eNB via initial access or handover, the eNB may signal the CSI-RS configuration to the corresponding UE via RRC signaling. Alternatively, when the eNB transmits an RRC signaling message for requesting channel state feedback based on CSI-RS measurement to the UE, the eNB may signal the CSI-RS configuration to the corresponding UE via the corresponding RRC signaling message.

A time position of a CSI-RS, that is, a cell-specific subframe configuration period and a cell-specific subframe offset may be summarized, for example, according to Table 1 below.

TABLE 1

| CSI-RS subframe configuration $I_{CSI-RS}$ | CSI-RS period $T_{CSI-RS}$ (subframe) | CSI-RS subframe offset $\Delta_{CSI-RS}$ (subframe) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

As described above, a parameter $I_{CSI-RS}$ may be separately configured for a CSI-RS to be assumed as non-zero transmission power by a UE and a CSI-RS to be assumed as transmission power of 0. A subframe including a CSI-RS may be represented according to Equation 12 below (in Equation 12, $n_f$ is a system frame number and $n_s$ is a slot number).

$$(10n_f + \lfloor n_s/2 \rfloor - \Delta_{CSI-RS}) \bmod T_{CSI-RS} = 0 \quad \text{[Equation 12]}$$

A CSI-RS-Config information element (IE) defined in Table 2 below may be used to specify a CSI-RS configuration.

TABLE 2

CSI-RS-Config information elements

```
-- ASN1START
CSI-RS-Config-r10 ::=       SEQUENCE {
    csi-RS-r10              CHOICE {
        release             NULL,
        setup               SEQUENCE {
            antennaPortsCount-r10   ENUMERATED {an1, an2, an4, an8},
            resourceConfig-r10      INTEGER (0..31),
            subframeConfig-r10       INTEGER (0..154),
            p-C-r10                 INTEGER (-8..15)
        }
    }                                                   OPTIONAL,
    zeroTxPowerCSI-RS-r10   CHOICE {
        release             NULL,
        setup               SEQUENCE {
            zeroTxPowerResourceConfigList-r10  BIT STRING (SIZE (16)),
            zeroTxPowerSubframeConfig-r10      INTEGER (0..154)
        }
    }                                                   OPTIONAL
}
-- ASN1STOP
```

In Table 2 above, a parameter antennaPortsCount may refer to an antenna port (i.e., a CSI-RS port) used to transmit a CSI-RS, an1 may correspond to 1, and an2 may correspond to 2.

In Table 2 above, a parameter p_C may refer to a ratio of a PDSCH energy per resource element (PDSCH EPRE) assumed when a UE derives CSI feedback.

In Table 2 above, a parameter resourceConfig may have a value for determination of a position of a resource element to which a CSI-RS is mapped on a RB pair illustrated in FIG. 8.

In Table 2 above, a parameter subframeConfig may correspond to $I_{CSI-RS}$ in Table 1 above.

In Table 2 above, zeroTxPowerResourceConfigList and zeroTxPowerSubframeConfig correspond to resourceConfig and subframeConfig of a CSI-RS of transmission power of 0, respectively.

For a detailed description of CSI-RS configuration IE of Table 2 above, reference may be made to the standard document TS 36.331.

Channel State Information (CSI)

MIMO schemes may be classified into open-loop MIMO and closed-loop MIMO. In open-loop MIMO, a MIMO transmitter performs MIMO transmission without receiving a CSI feedback from a MIMO receiver. On the other hand, the MIMO transmitter receives a CSI feedback from the MIMO receiver and performs MIMO transmission based on the CSI feedback in closed-loop MIMO. To achieve the multiplexing gain of MIMO Tx antennas, the transmitter and the receiver each may perform beamforming based on CSI in the closed-loop MIMO scheme. To enable the receiver (e.g. a UE) to feed back CSI, the transmitter (e.g. an eNB) may allocate a UL control channel or a UL shared channel to the receiver (e.g. a UE).

The UE may estimate and/or measure a DL channel using the CRS and/or the CSI-RS. The CSI fed back by the UE to the eNB may include an RI, a PMI, and a CQI.

An RI is information about a channel rank. The channel rank is the maximum number of layers (or streams) that may carry different information in the same time-frequency resources. Because the rank is determined mainly according to the long-term fading of a channel, the RI may be fed back in a longer period (i.e. less frequently) than a PMI and a CQI.

A PMI is information about a precoding matrix used for transmission of a transmitter, reflecting the spatial characteristics of channels. Precoding refers to mapping transmission layers to Tx antennas. A layer-antenna mapping relationship may be determined according to a precoding matrix. The PMI is the index of an eNB precoding matrix preferred by the receiver (e.g. a UE or an RN), selected based on a metric such as Signal-to-Interference plus Noise Ratio (SINR), etc. In order to reduce the feedback overhead of precoding information, the transmitter and the receiver may share a codebook with a plurality of precoding matrices and the receiver may feedback only the index of a specific precoding matrix in the codebook. For example, the PMI may be determined based on most recently reported RI.

A CQI is information representing channel quality or channel strength. The CQI may be expressed as a predetermined MCS set. That is, a feedback CQI index indicates a corresponding modulation scheme and coding rate. The CQI may be calculated by configuring a specific resource region (e.g., a region specified by a valid subframe and/or a physical resource block) as a CQI reference resource, assuming that PDSCH transmission is present in the corresponding CQI reference resource, and assuming that a PDSCH is received so as not to exceed predetermined error probability (e.g., 0.1). In general, the CQI reflects a reception SINR that can be achieved when an eNB configures spatial channels using a PMI. For example, the CQI may be calculated based on the most recently reported RI and/or PMI.

A system supporting an extended antenna configuration (e.g. an LTE-A system) considers achievement of an additional multi-user diversity by the use of MU-MIMO. Due to the existence of interference channels between UEs multiplexed in an antenna domain in MU-MIMO, it is necessary to avoid interference with other UEs, when an eNB transmits a DL signal to one of multiple UEs based on a CSI feedback received from the one UE. Accordingly, more accurate CSI than in Single User MIMO (SU-MIMO) should be fed back for a reliable MU-MIMO operation.

For more accurate measurement and reporting of CSI, a new CSI feedback scheme may be adopted by modifying conventional CSI including an RI, a PMI, and a CQI. For example, precoding information fed back from the receiver may be indicated by a set of two PMIs (e.g., i1 and i2). Accordingly, more precise PMI may be fed back and more precise CQI may be calculated and reported based on the precise PMI.

The CSI may be periodically transmitted through a PUCCH or may be aperiodically transmitted through a PUSCH. In addition, various reporting modes may be defined according to data that is fed back among RI, first PMI (e.g., W1), second PMI (e.g., W2), and CQI, and a wideband or a subband to which the fed back PMI and/or CQI relates.

CQI Calculation

On the assumption that a DL receiver is a UE, CQI calculation will be described below. However, it is to be understood that the same description applies to an RN serving as a DL reception entity.

A method for configuring/defining a reference resource in which the UE calculates a CQI (hereinafter, referred to as a CQI reference resource) for CSI reporting will be described. First of all, the definition of a CQI will be described in greater detail.

A CQI reported by the UE is a specific index. The CQI index represents a modulation scheme, a coding rate, etc. corresponding to a channel state. For example, [Table 3] lists CQI indexes and their interpretations.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an unrestricted observation interval in time and frequency, the UE may determine, for each CQI value reported in UL subframe n, the highest CQI index between 1 and 15 in [Table 3] which satisfies the following condition. A single PDSCH transport block that has a combination of modulation scheme (e.g., MCS) and Transport Block Size (TBS) corresponding to the CQI index and occupies a group of DL physical resource blocks termed a CQI reference resource, can be received with a TB error probability not exceeding 0.1 (i.e. 10%). If even CQI index 1 does not satisfy the condition, the UE may select CQI index 0.

In transmission mode 9 (corresponding to up to 8-layer transmission) and feedback reporting mode, the UE may perform channel measurement only on a CSI-RS in order to calculate a CQI value to be reported in UL subframe n. In other transmission modes and corresponding reporting modes, the UE may perform channel measurement on a CRS, for CQI calculation.

A combination of modulation scheme and TBS may correspond to a CQI index, if the combination of modulation scheme and TBS can be signaled for transmission on a PDSCH in the CQI reference resource according to a relevant TBS table, the modulation scheme is indicated by the CQI index, and when applied to the reference resource, the combination of TBS and modulation scheme results in the code rate which is the closest possible to the code rate indicated by the CQI index. If more than one combination of TBS and modulation scheme results in a code rate equally close to the code rate indicated by the CQI index, only the combination with the smallest TBS is selected.

The CQI reference resource is defined as follows.

In the frequency domain, the CQI reference resource is defined by a group of DL physical resource blocks corresponding to a band to which the derived CQI value relates.

In the time domain, the CQI reference resource is defined by a single DL subframe $n-n_{CQI\_ref}$. For periodic CQI reporting, $n_{CQI\_ref}$ is the smallest value equal to or greater than 4, such that DL subframe $n-n_{CQI\_ref}$ corresponds to a valid DL subframe. For aperiodic CQI reporting, $n-n_{CQI\_ref}$ is determined such that the reference resource is in the same valid DL subframe corresponding to a CQI request (or the same valid DL subframe in which a CQI request is received) in a UL DCI format (a PDCCH DCI format for providing UL scheduling control information to the UE). In addition, for aperiodic CQI reporting, $n_{CQI\_ref}$ is equal to 4 and DL subframe $n-n_{CQI\_ref}$ corresponds to a valid DL subframe. Herein, DL subframe $n-n_{CQI\_ref}$ may be received after a subframe with a corresponding CQI request (a subframe carrying a CQI request) in a Random Access Response Grant. A DL subframe is considered to be valid if it is configured as a DL subframe for that UE, it is not an MBSFN subframe except in transmission mode 9, it does not contain a DwPTS field in case the length of DwPTS is $7680 \cdot T_s$ ($T_s=1/(15000\times2048)$ seconds) and less, and it does not fall within a configured measurement gap for that UE. If there is no valid DL subframe for the CQI reference resource, CQI reporting may be omitted in UL subframe n.

In the layer domain, the CQI reference resource is defined by any RI and PMI on which the CQI is conditioned.

In the CQI reference resource, the UE may assume the followings for the purpose of deriving the CQI index: (1) the first 3 OFDM symbols of a DL subframe being occupied by control signaling, (2) no REs used by primary or secondary synchronization signals or a PBCH, (3) the CP length of the non-MBSFN subframes, (4) redundancy version 0, (5) a PDSCH Energy Per Resource Element (EPRE) to CSI-RS EPRE ratio having a specific value indicated by upper layer signaling, in the case of a CSI-RS being used for channel measurement, (6) PDSCH transmission schemes (e.g., single antenna port transmission, transmission diversity, spatial multiplexing, MU-MIMO, etc.) for respective transmission modes configured for the UE (which may be the default mode), and (7) a PDSCH EPRE-to-CRS EPRE ratio being determined according to a predetermined condition, in the case of a CRS being used for channel measurement. For more details of CQI definition, refer to 3GPP TS36.213.

In summary, the DL receiver (e.g. a UE or an RN) may set a past specific single subframe as a CQI reference resource at the moment of CQI calculation and may calculate a CQI value such that the condition of a PDSCH being received from the eNB in the CQI reference resource with an error probability not exceeding 10% is satisfied.

Codebook-Based Precoding Scheme

Precoding for appropriately distributing transmitted information to each antenna according to a channel situation and so on may be applied in order to support multiple antenna transmission. The codebook-based precoding scheme may refer to a scheme for predetermining a set of precoding matrices in a transmitter and a receiver, measuring channel information from the transmitter by the receiver to feedback a most appropriate precoding matrix (i.e., a precoding matrix index (PMI) to the transmitter, and applying appropriate precoding to signal transmission based on the PMI by the transmitter. The codebook-based precoding scheme is a method for selecting an appropriate precoding matrix from the predetermined set of the precoding matrices, and thus optimum precoding information is not always applied, but the codebook-based precoding scheme is advantageous in that feedback overhead is reduced compared to the case in which optimum precoding information is explicitly fed back to actual channel information.

Figure 10:
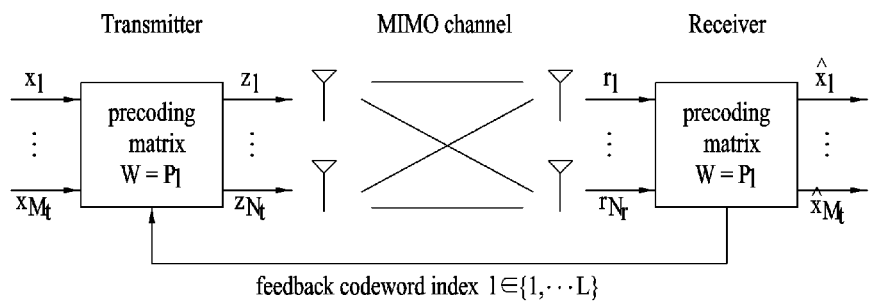
FIG. 10 is a diagram for explanation of basic concept of codebook-based precoding.

FIG. 10 is a diagram for explanation of basic concept of codebook-based precoding.

When the codebook-based precoding scheme is applied, a transmitter and a receiver may share codebook information including a predetermined number of precoding matrices according to transmission rank, the number of antennas, and so on. That is, when feedback information is finite, a precoding-based codebook method may be used. The receiver may measure a channel state through a received signal and feedback a finite number of preferred precoding matrix information (i.e., an index of the corresponding precoding matrix) to the transmitter based on the aforementioned codebook information. For example, the receiver may measure a received signal via a maximum likelihood (ML) or minimum mean square error (MMSE) method and select an optimum precoding matrix. Although FIG. 10 illustrates the case in which the receiver transmits precoding matrix information to the transmitter for each codeword, the present invention is not limited thereto.

The transmitter that receives feedback information from the receiver may select a specific precoding matrix from a codebook based on the received information. The transmitter that selects a precoding matrix may perform by multiplying a corresponding number of layer signals corresponding to transmission rank by the selected precoding matrix and may transmit the transmitted signal on which precoding is performed through a plurality of antennas. In the precoding matrix, the number of rows may be equal to the number of antennas and the number of columns may be equal to a rank value. Since the rank value is equal to the number of layers, the number of columns may be equal to the number of layers. For example, when the number of transmit antennas is 4 and the number of transmission layers is 2, the precoding matrix may be configured as a 4×2 matrix. Information that is transmitted through each layer may be mapped to each antenna through the precoding matrix.

The receiver that receives a signal precoded and transmitted by the transmitter may perform opposite processing of precoding performed by the transmitter to restore the received signal. In general, a precoding matrix may satisfy a condition of a unitary matrix U such as $U*U^H=I$, and thus the aforementioned opposite processing of the precoding may be performed by multiplying the received signal by Hermit matrix $P^H$ of a precoding matrix P used in precoding of the transmitter.

For example, Table 4 below shows a codebook used for DL transmission using 2-transmit antenna in 3GPP LTE release-8/9, and Table 5 below shows a codebook used for DL transmission using 4-transmission antenna in 3GPP LTE release-8/9.

TABLE 4

| Codebook | Number of rank | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 5

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5 above, $W_n^{\{s\}}$ is acquired based on a set $\{s\}$ configured from an equation represented according to $W_n = I - 2u_n u_n^H / u_n^H u_n$. In this case, I refers to a 4×4 single matrix and $u_n$ is given in Table 5 above.

As shown in Table 4 above, a codebook with two transmit antennas may have a total of 7 precoding vectors/matrices. Here, a single matrix is only for an open-loop system, and thus the number of precoding vectors/matrices for precoding a close-loop system is total 6. In addition, a codebook for four transmit antennas shown in Table 5 above may have a total of 64 precoding vectors/matrices.

In addition, a system supporting an extended antenna configuration (e.g. a 3GPP LTE release-10 or subsequent system) may perform, for example, MIMO transmission using 8 transmit antennas and requires to design a codebook for supporting the MIMO transmission.

For CSI reporting for a channel transmitted through 8 antenna ports, codebooks shown in Tables 6 to 13 below may be used. The 8 CSI-RS antenna ports may be represented by antenna port indexes 15 to 22, respectively. Tables 6, 7, 8, 9, 10, 11, 12, and 13 show examples of codebooks for 1-layer, 2-layer, 3-layer, 4-layer, 5-layer, 6-layer, 7-layer, and 8-layer CSI reporting using antenna ports 15 to 22, respectively.

In Tables 6 to 13 below, $\phi_n$ and $v_m$ may be given according to Equation 13 below.

$$\phi_n = e^{j\pi n/2}$$

$$v_m = [1 \ e^{j2\pi m/32} \ e^{j4\pi m/32} \ e^{j6\pi m/32}]^T \qquad \text{[Equation 13]}$$

TABLE 6

| $i_1$ | $i_2$ | | | |
|---|---|---|---|---|
|  | 0 | 1 | 2 | 3 |
| 0-15 | $W_{2i_1,0}^{(1)}$ | $W_{2i_1,1}^{(1)}$ | $W_{2i_1,2}^{(1)}$ | $W_{2i_1,3}^{(1)}$ |

| $i_1$ | $i_2$ | | | |
|---|---|---|---|---|
|  | 4 | 5 | 6 | 7 |
| 0-15 | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ | | | |
|---|---|---|---|---|
|  | 8 | 9 | 10 | 11 |
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ |

| $i_1$ | $i_2$ | | | |
|---|---|---|---|---|
|  | 12 | 13 | 14 | 15 |
| 0-15 | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \dfrac{1}{\sqrt{8}} \begin{bmatrix} v_m \\ \varphi_n v_m \end{bmatrix}$

TABLE 7

| $i_1$ | $i_2$ | | |
|---|---|---|---|
|  | 0 | 1 | 2 |
| 0-15 | $W_{2i_1,2i_1,0}^{(2)}$ | $W_{2i_1,2i_1,1}^{(2)}$ | $W_{2i_1+1,2i_1+1,0}^{(2)}$ |

| $i_1$ | $i_2$ | | |
|---|---|---|---|
|  | 3 | 4 | 5 |
| 0-15 | $W_{2i_1+1,2i_1+1,1}^{(2)}$ | $W_{2i_1+2,2i_1+2,0}^{(2)}$ | $W_{2i_1+2,2i_1+2,1}^{(2)}$ |

TABLE 7-continued

| $i_1$ | $i_2$ | | |
|---|---|---|---|
|  | 6 | 7 | 8 |
| 0-15 | $W_{2i_1+3,2i_1+3,0}^{(2)}$ | $W_{2i_1+3,2i_1+3,1}^{(2)}$ | $W_{2i_1,2i_1+1,0}^{(2)}$ |

| $i_1$ | $i_2$ | | |
|---|---|---|---|
|  | 9 | 10 | 11 |
| 0-15 | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ | | |
|---|---|---|---|
|  | 12 | 13 | 14 |
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ |

| $i_1$ | $i_2$ |
|---|---|
|  | 15 |
| 0-15 | $W_{2i_1+1,2i_1+3,1}^{(2)}$ | where $W_{m,m',n}^{(2)} = \dfrac{1}{4} \begin{bmatrix} v_m & v_{m'} \\ \varphi_n v_m & -\varphi_n v_{m'} \end{bmatrix}$

TABLE 8

| $i_1$ | $i_2$ | | |
|---|---|---|---|
|  | 0 | 1 | 2 |
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ |

| $i_1$ | $i_2$ | | |
|---|---|---|---|
|  | 3 | 4 | 5 |
| 0-3 | $\tilde{W}_{8i_1+8,8i_1,8i_1}^{(3)}$ | $W_{8i_1+2,8i_1+2,4i_1+10}^{(3)}$ | $W_{8i_1+10,8i_1+2,8i_1+10}^{(3)}$ |

| $i_1$ | $i_2$ | | |
|---|---|---|---|
|  | 6 | 7 | 8 |
| 0-3 | $\tilde{W}_{8i_1+2,8i_1+10,8i_1+10}^{(3)}$ | $\tilde{W}_{8i_1+10,8i_1+2,8i_1+2}^{(3)}$ | $W_{8i_1+4,8i_1+4,8i_1+12}^{(3)}$ |

| $i_1$ | $i_2$ | | |
|---|---|---|---|
|  | 9 | 10 | 11 |
| 0-3 | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ | | |
|---|---|---|---|
|  | 12 | 13 | 14 |
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ |

| $i_1$ | $i_2$ |
|---|---|
|  | 15 |
| 0-3 | $\tilde{W}_{8i_1+14,8i_1+6,8i_1+6}^{(3)}$ | where $W_{m,m',m''}^{(3)} = \dfrac{1}{\sqrt{24}} \begin{bmatrix} v_m & v_{m'} & v_{m''} \\ v_m & -v_{m'} & -v_{m''} \end{bmatrix}$, $\tilde{W}_{m,m',m''}^{(3)} = \dfrac{1}{\sqrt{24}} \begin{bmatrix} v_m & v_{m'} & v_{m''} \\ v_m & v_{m'} & -v_{m''} \end{bmatrix}$,

TABLE 9

| $i_1$ | $i_2$ | | |
|---|---|---|---|
| | 0 | 1 | 2 |
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ |

| $i_1$ | $i_2$ | | |
|---|---|---|---|
| | 3 | 4 | 5 |
| 0-3 | $W_{8i_1+2,8i_1+10,1}^{(4)}$ | $W_{8i_1+4,8i_1+12,0}^{(4)}$ | $W_{8i_1+4,8i_1+12,1}^{(4)}$ |

| $i_1$ | $i_2$ | |
|---|---|---|
| | 6 | 7 |
| 0-3 | $W_{8i_1+6,8i_1+14,0}^{(4)}$ | $W_{8i_1+6,8i_1+14,1}^{(4)}$ | where $W_{m,m',n}^{(4)} = \dfrac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 10

| $i_1$ | $i_2$ |
|---|---|
| | 0 |
| 0-3 | $W_{i_1}^{(5)} = \dfrac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 11

| $i_1$ | $i_2$ |
|---|---|
| | 0 |
| 0-3 | $W_{i_1}^{(6)} = \dfrac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 12

| $i_1$ | $i_2$ |
|---|---|
| | 0 |
| 0-3 | $W_{i_1}^{(7)} = \dfrac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 13

| $i_1$ | $i_2$ |
|---|---|
| | 0 |
| 0 | $W_{i_1}^{(8)} = \dfrac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Multi-Antenna Configuration

Figure 11:
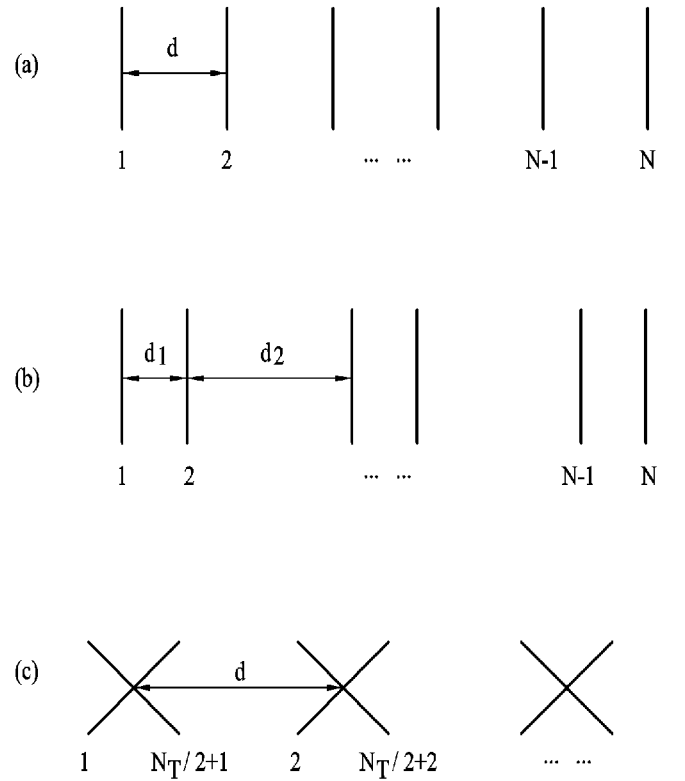
FIG. 11 is a diagram showing the configuration of 8 transmit (Tx) antennas.

FIG. 11 is a diagram showing the configuration of 8 transmit (Tx) antennas.

FIG. 11(a) shows the case in which N antennas configure independent channels without grouping, which is generally referred to as a uniform linear array (ULA).

FIG. 11(b) shows a paired ULA in which two antennas forms a pair. In this case, an associated channel is present between the paired antennas and different pairs of antennas may have independent channels.

When many transmit antennas need to be installed in a small space, the ULA antenna configuration shown in FIGS. 11(a) and 11(b) may not be suitable. Accordingly, as shown in FIG. 11(c), a dual-pole (or cross-pole or cross polarization structure) antenna configuration may be applied. If such a transmit antenna configuration is used, although a distance d between antennas is relatively short, antenna correlation may be low to configure independent channels. Therefore, high data transmission throughput can be obtained.

In the example of FIG. 11(c), when a total of $N_T$ transmit antennas are configured, a group 1 up to indexes 1, 2, . . . , $N_T/2$ and a group 2 up to indexes $N_T/2+1, N_T/2+2, \ldots, N_T$ may be configured to be orthogonal to each other. Antennas of the antenna group 1 may have the same polarization (e.g., vertical polarization) and antennas of the antenna group 2 may have other the same polarization (e.g., horizontal polarization). In addition, the two antenna groups may be co-located. For example, antenna 1 and $N_T/2+1$, antenna 2 and $N_T/2+2$, antenna 3 and $N_T/2+3$, . . . , antenna $N_T/2$ and $N_T$ may be co-located. In other words, antennas in one antenna group may have the same polarization such as a uniform linear array (ULA) and a correlation between antennas of one antenna group may have linear phase increment properties. In addition, the correlation between antenna groups may have phase rotation properties.

1-D Antenna Configuration

A 1-D antenna configuration may include ULA or cross-pole antenna array configuration illustrated in FIG. 11. When the 1-D antenna configuration is applied, the aforementioned RS transmission and CSI feedback method may be applied. That is, for DL transmission, in order to estimate a channel between a transmitter and a receiver (or between an eNB and a UE), the transmitter may transmit an RS (e.g., a CRS or a CSI-RS) to the receiver and the receiver may estimate a channel state from the RS. The receiver may calculate rank, precoding weight, and CQI based thereon, which are expected to be suitable for DL data transmission, based on channel information acquired through the RS.

For MIMO transmission such as precoded spatial multiplexing, precoding information may be required and the precoding weight may be configured in the form of a codebook.

For example, CSI feedback for precoded spatial multiplexing (SM) using CRS in a MIMO system using four transmit antennas (hereinafter, referred to as 4Tx) may be described as follows. When an eNB with 4Tx transmits a CRS, if indexes of antenna port AP mapped to each RS are AP0, 1, 2, and 3, respectively, the UE may estimate a channel from AP0, 1, 2, and 3 using the CRS.

In this case, when a matrix (or a vector) representing a channel estimated by the UE is H, H=[$H_{11}$ $H_{12}$ $H_{13}$ $H_{14}$; $H_{21}$ $H_{22}$ $H_{23}$ $H_{24}$; . . . ; $H_{Nr1}$ $H_{Nr2}$ $H_{Nr3}$ $H_{Nr4}$] may be represented. That is, H may be represented by a matrix (or a vector) with a size of Nr×Nt. Here, Nr refers to the number of reception antennas and Nt refers to the number of transmit antennas.

In addition, a UE may assume that an eNB transmits data using a precoding weight matrix (or a vector) $W_m(k)$. In $W_m(k)$, m refers to transmission rank, and k refers to an index of a precoding weight matrix (or a vector) defined for Rank-m. $W_m(k)$ may be represented by $W_m(k)=[W_{11}\ W_{12}\ W_{13}\ \ldots\ W_{1m};\ W_{21}\ W_{22}\ W_{23}\ \ldots\ W_{2m};\ W_{31}\ W_{32}\ W_{33}\ \ldots\ W_{3m};\ \ldots;\ W_{41}\ W_{42}\ W_{43}\ \ldots\ W_{4m}]$. That is, $W_m(k)$ may be represented by a matrix (or a vector) with a size of Nt×m.

The UE may calculate equivalence channel $H_{eq}$. The equivalence channel $H_{eq}$ may be calculated by synthesizing an estimated channel H and the precoding weight $W_m(k)$ (i.e., $H_{eq}=HW_m(k)$) or synthesizing a covariance matrix R of the estimated channel and the precoding weight $W_m(k)$ (i.e., $H_{eq}=RW_m(k)$). The UE may select rank and a precoding weight appropriate for DL transmission based on the equivalence channel $H_{eq}$. In addition, the UE may calculate CQI that is predicted when the selected rank and precoding weight are applied.

As another example, CSI feedback for spatial multiplexing (SM) precoded using a CSI-RS in a MIMO system using 8 transmit (hereinafter, referred to as 8Tx) antennas (hereinafter, referred to as 8Tx) will be described below. When an eNB with 8Tx antennas transmits a CSI-RS, if indexes of antenna ports (APs) mapped to respective RSs are AP15, 16, 17, 18, 19, 20, 21, and 22, respectively, the UE may estimate a channel from AP15, 16, 17, 18, 19, 20, 21, and 22 using the CSI-RS.

In this case, when a matrix (a vector) representing a channel estimated by the UE is H, H may be represented by $H=[H_{11}\ H_{12}\ H_{13}\ H_{14}\ H_{15}\ H_{16}\ H_{17}\ H_{18};\ H_{21}\ H_{22}\ H_{23}\ H_{24}\ H_{25}\ H_{26}\ H_{27}\ H_{28};\ \ldots;\ H_{Nr1}\ H_{Nr2}\ H_{Nr3}\ H_{Nr4}\ H_{Nr5}\ H_{Nr6}\ H_{Nr7}\ H_{Nr8}]$ (here, Nr refers to the number of Rx antennas).

In addition, the UE may assume that the eNB transmits data using the precoding weight matrix (or vector) $W_m(k)$, $W_m(k)$ may be represented by $W_m(k)=[W_{11}\ W_{12}\ W_{13}\ \ldots\ W_{1m};\ W_{21}\ W_{22}\ W_{23}\ \ldots\ W_{2m};\ W_{31}\ W_{32}\ W_{33}\ \ldots\ W_{3m};\ \ldots;\ W_{81}\ W_{82}\ W_{83}\ \ldots\ W_{8m}]$.

In addition, the UE may select rank and a precoding weight appropriate for DL transmission based on the equivalence channel $H_{eq}$ (here, calculation is performed according to $H_{eq}=HW_m(k)$ or $H_{eq}=RW_m(k)$) and calculate CQI that is predicted when the selected rank and precoding weight are applied.

Accordingly, in a MIMO system for supporting Nt Tx antennas, the UE may feedback the CSI (e.g., RI, PMI, and CQI) selected/calculated using the CRS or CSI-RS to the eNB. The eNB may determine rank, a precoding weight, a modulation and coding scheme, and so on, which are appropriate for DL transmission, in consideration CSI reported by the UE.

2D Antenna Configuration

A beam formed by a 1-D antenna configuration such as a legacy ULA can be specified only in an azimuth angle direction (e.g., horizontal domain) and cannot be specified in an elevation angle direction (e.g., vertical domain), and thus only 2D beamforming may be supported. The 1-D antenna configuration (e.g., ULA or cross-pole array configuration) may support adaptive beamforming of the azimuth angle direction or spatial multiplexing, and a legacy wireless communication system (e.g., a system being conformable to 3GPP LTE release-8, 9, 10, and 11) designs only a MIMO transmission and reception scheme therefor.

When a 2D antenna configuration-based MIMO transmission and reception scheme is supported for enhancing system performance, a beam formed by the 2D antenna configuration can be specified in an azimuth angle direction and an elevation angle direction, and thus 3D beamforming may be possible.

According to a function for specifying an azimuth angle and an elevation angle to form a beam, new beamforming such as sector-specific elevation beamforming (e.g., adaptive control using vertical pattern beamwidth and/or downtilt), improved sectorization in vertical domain, and UE-specific elevation beamforming may be supported.

The vertical sectorization may enhance system performance via gain of vertical sector pattern and in general may not require support of additional standard technology.

The UE-specific elevation beamforming may specific vertical antenna pattern in a UE direction to enhance SINR with respect to the corresponding UE. On the other hand, compared to vertical sectorization or sector-specific vertical beamforming, the UE-specific elevation beamforming requires support of additional standard technology. For example, in order to appropriately support a 2D port configuration, there is a need for a method for measuring and feeding back CSI of a UE for UE-specific elevation beamforming.

In order to support UE-specific elevation beamforming, there is a need for a DL MIMO improving method. The DL MIMO improving method may include the feature of, for example, improving the CSI feedback method of a UE (e.g., design of a new codebook, support of codebook selection/update/modification, and minimizing of increase in CSI payload size), change in CSI-RS configuration for UE-specific elevation beamforming, definition of an additional antenna port for UE-specific elevation beamforming, and improving a DL control operation for supporting UE-specific elevation beamforming (e.g., a method for ensuring common channel coverage and/or radio resource management (RRM) measurement reliability when the number of antenna ports is increased).

When the DL MIMO improving method is designed, various factors such as eNB antenna calibration error (error in terms of phase and time), estimation error, DL overhead, complexity, feedback overhead, backward compatibility, embodying of an actual UE, reuse of a legacy feedback framework, and subband versus wideband feedback may be considered.

Figure 12:
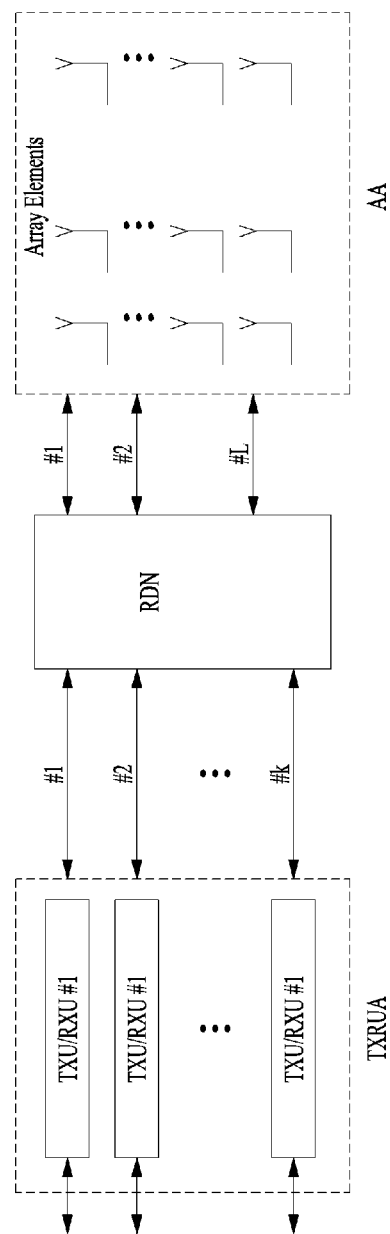
FIG. 12 is a diagram for explanation of a general configuration of an active antenna array system (AAS)

FIG. 12 is a diagram for explanation of a general configuration of an active antenna array system (AAS).

A configuration of the AAS may be logically represented by three main functional blocks. The three blocks may be referred to as a transceiver unit array (TXRUA), a radio distribution network (RDN), and an antenna array (AA). TXRUs may interface with an eNodeB, may provide reception input for baseband processing of an eNB, or may receive transmission output from the baseband processing of the eNB.

In detail, the TXRUA may include a plurality of transmitting units and a plurality of receiving units. The transmitting unit may receive baseband input from an AAS eNB, provide radio frequency (RF) transmitting output, and distribute the RF transmitting output to AA through a RDN. The receiving unit may provide the RF receiving input distributed from the AA through the RDN as output for baseband processing.

That is, the AAS may be defined as an eNB system for combining the AA and the active TXRUA. In addition, the AAS may include an RDN, may be a passive network for physically separating the active TXRUA from the AA, and may define mapping between the TXRUA and the AA. For example, the RDN may convert K transmitting outputs from the TXRUA into L outputs to the AA. In addition, the RDN may convert L receiving inputs from the AA into K inputs to the TXRUA.

In addition, the transmitting unit and the receiving unit may be separated from each other, and mapping for antenna elements may be differently defined between the transmitting unit and the receiving unit.

An eNB system including the AAS may be assumed to support transmit diversity, beamforming, spatial multiplexing, or any combination thereof.

Figure 13:
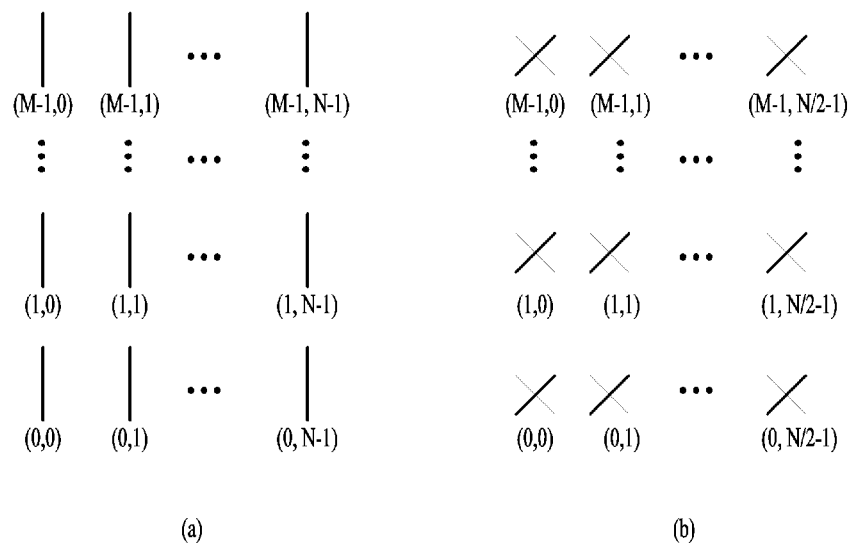
FIG. 13 is a diagram for explanation of a 2D antenna array configuration.

FIG. 13 is a diagram for explanation of a 2D antenna array configuration.

FIG. 13(a) illustrates an M×N antenna array, and respective antenna elements may be denoted by indexes (0, 0) to (M−1, N−1). In the antenna array of FIG. 13(a), one column or one row may include a ULA.

FIG. 13(b) illustrates a M×(N/2) antenna array, and respective antenna elements may be denoted by (0, 0) to (M−1, N/2−1). In the antenna array of FIG. 13(b), one column or one row may include a cross-pole array pair.

Figure 14:
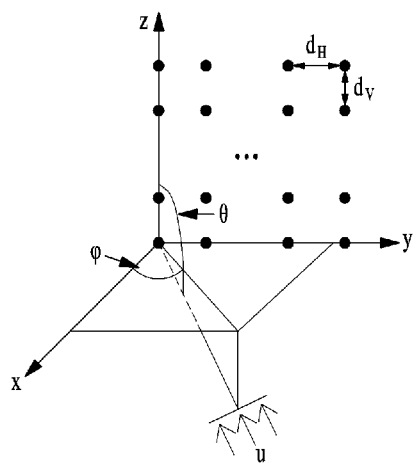
FIG. 14 is a diagram for geometric explanation of an AAS.

FIG. 14 is a diagram for geometric explanation of an AAS.

FIG. 14 illustrates a 3D space (i.e., a space defined by x, y, and z axes) for explanation of an array factor with a plurality of columns formed by a uniform rectangular array (URA) antenna configuration. Here, it is assumed that $N_H$ antenna elements are present in a horizontal direction (or in a y axis direction) on the yz plane, and $N_V$ antenna elements are present in a vertical direction (or in a z axis direction) on the yz plane. In addition, an interval antenna element in a horizontal direction may be defined as $d_H$ and an interval between antenna elements in a vertical direction may be defined as $d_V$.

A direction of a signal applied to an antenna array element is represented by u. An elevation angle of the signal direction may be represented by θ and an azimuth angle of the signal direction may be represented by φ.

Figure 15:
FIG. 15 is a diagram for explanation of definition of an angle direction.

FIG. 15 is a diagram for explanation of definition of an angle direction.

As illustrated in FIG. 15(a), the elevation angle θ may be defined as a value of 90° to −90°, may refer to an angle directed downward (or toward the ground) as closer to 90° and refer to an angle directed upward as closer to −90°, and 0° may be a value indicating a direction perpendicular to the antenna array element. In addition, as illustrated in FIG. 15(b), the azimuth angle φ may be defined as a value of 0° to 180°.

According to a reference value, the elevation angle θ of the signal direction may be defined as a value of 0° to 180°, and in this case, the elevation angle θ may refer to an angle directed downward (or toward the ground) as closer to 0° and refer to an angle directed upward as closer to 180°, and 90° may be a value indicating a direction perpendicular to the antenna array element. In addition, the azimuth angle φ may be defined as a value of −180° to 180°.

The RDN may apply a complex weight to a signal from each port and distribute the signal to a sub-array to control side lobe levels and a tilt angle. The complex weight application may include amplitude weight application and phase shift. A complex weight $w_{m,n}$ for an antenna element (m, n) may be given according to Equation 14 below.

$$w_{m,n}=|w_{m,n}|\exp(-j2\pi\lambda_0^{-1}(\bar{\varphi}_{etilt}\cdot\bar{r}_{m,n})), (m,n)\in S_p \qquad [\text{Equation 14}]$$

In Equation 14 above, m=0, 1, ..., $N_H$ or m=1, 2, ..., $N_H$ and n=0, 1, ..., $N_V$ or n=1, 2, ..., $N_V$. $S_p$ is a set of antenna elements of a sub-array associated with the antenna port p. $|w_{m,n}|$ is an amplitude weight applied to the antenna element (m, n). $\lambda_0$ refers to a wavelength on a free-space. $\bar{r}_{m,n}$ may refer to an element position vector and may be defined according to Equation 15 below. $\bar{\varphi}_{etilt}$ may refer to a unit direction vector and may be defined according to Equation 16 below.

$$\bar{r}_{m,n}=[0 \; n\cdot d_H \; m\cdot d_V]^T \qquad [\text{Equation 15}]$$

As seen from Equation 15 above, $\bar{r}_{m,n}$ may refer to a distance from the origin of the antenna element (m, n).

$$\bar{\varphi}_{etilt}=[\cos\theta_{etilt}\cos\varphi_{escan} \; \cos\theta_{etilt}\sin\varphi_{escan} \; \sin\theta_{etilt}]^T \qquad [\text{Equation 16}]$$

In Equation 16 above, $\theta_{etilt}$ may correspond to a vertical steering angle or an elevation angle, and $\theta_{escan}$ may correspond to a horizontal steering angle or an azimuth angle. That is, Equation 16 above shows a beam direction in a 3D space as an angle. From a this point of view, beamforming may compensate for a difference between phases experienced by respective antennas in the same way so as to adjust a direction of a beam formed from the antenna array to a specific angle.

An antenna pattern $A_p$ indicating a radiation pattern for an antenna port p may be given according to Equation 17 below. The radiation pattern may be a shape of a beam formed by the antenna port p. For example, the beam may be formed with a thin shape concentrated on a predetermined position or a thick shape toward a predetermined range.

$$A_p(\theta, \varphi) = A_E(\theta, \varphi) + 10\log_{10}\left(\left|\sum_{(m,n)\in S_p} w_{m,n}\cdot v_{m,n}\right|^2\right) \qquad [\text{Equation 17}]$$

In Equation 17 above, $A_E(\varphi, \theta)$ may refer to a composite array element pattern with a unit of dB and may be conformable to definition in an element pattern of Table 14 below (values of parameters (e.g., the number of radiation elements per column, the number of columns, and maximum array gain in one column) required to apply the element pattern of Table 14 may refer to the document, for example, Technical Report (TR) 37.840).

TABLE 14

| | |
|---|---|
| Horizontal radiation pattern in dB | $A_{E,H}(\varphi) = -\min\left[12\left(\frac{\varphi}{\varphi_{3dB}}\right)^2, A_m\right] dB$ |
| Front to back ratio | $A_m = 30$ dB |
| Vertical radiation pattern in dB | $A_{E,V}(\theta) = -\min\left[12\left(\frac{\theta}{\theta_{3dB}}\right)^2, SLA_v\right]$ |
| Side lobe lower level | $SLA_v = 30$ dB |
| Element pattern | $A_E(\varphi, \theta) = G_{E,max} - \min\{-[A_{E,H}(\varphi) + A_{E,V}(\theta)], A_m\}$ |
| Element Gain | $G_{E,max} = 8$ dBi |

In Equation 17 below, $v_{m,n}$ may refer to a phase shift factor due to array placement and may be given according to Equation 18 below.

$$v_{m,n}=\exp(j2\pi\lambda_0^{-1}(\bar{\varphi}\cdot\bar{r}_{m,n})), (m,n)\in S_p \qquad [\text{Equation 18}]$$

In Equation 18 above, $\bar{\varphi}$ may be given according to Equation 19 below.

$$\bar{\varphi}=[\cos\theta\cos\varphi \; \cos\theta\sin\varphi \; \sin\theta]^T \qquad [\text{Equation 19}]$$

In addition, maximum antenna gain of the AAS needs to be defined as the sum of passive maximum antenna gain and cable network losses.

Hereinafter, a plane array antenna (or URA) configuration will be described with reference to FIGS. 16 and 17.

Figure 16:
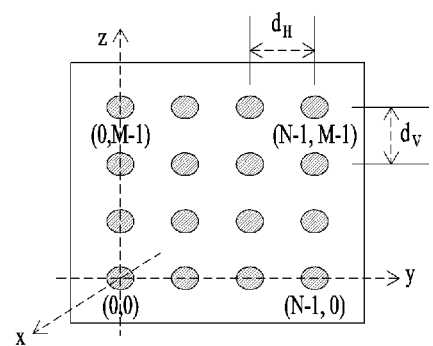
FIG. 16 is a diagram illustrating a plane array antenna configuration.
Figure 17:
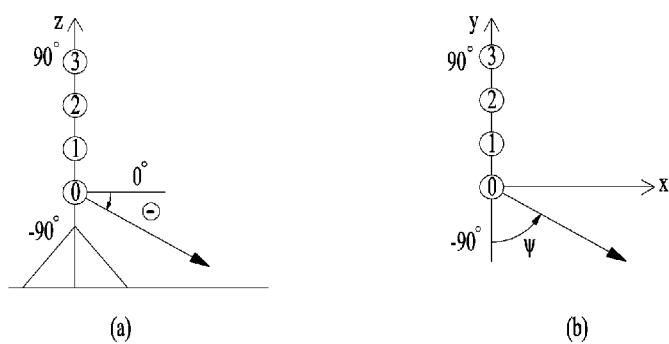
FIG. 17 is a diagram for explanation of another definition of an angle direction.

FIG. 16 is a diagram illustrating a plane array antenna configuration and FIG. 17 is a diagram for explanation of another definition of an angle direction.

Although the example of FIG. 14 considers 2D placement of an antenna element (m, n), the example of FIG. 16 considers 2D placement of the antenna element (n, m).

In the example of FIG. 15, an elevation angle θ is defined as a value of −90° to 90° (in this case, 0° is a value indicating a direction perpendicular to an antenna array element) and an azimuth angle ϕ is defined as an angle between 0° and 180°, but in the example of FIG. 17, the reference value may be changed and an angle of the signal direction may be defined.

For example, as illustrated in FIG. 17(a), the elevation angle θ may be defined as a value of −90° to 90°, may refer to an angle directed downward (or toward the ground) as closer to 90° and refer to an angle directed upward as closer to −90°, and 0° may be a value indicating a direction perpendicular to the antenna array element. In addition, as illustrated in FIG. 17(b), the azimuth angle ϕ may be defined as a value of −90° to 90°.

FIG. 18 is a diagram illustrating examples of beamforming according to a 2D antenna configuration.

FIG. 18(a) illustrates vertical sectorization according to 3D beamforming, and FIG. 18(b) illustrates vertical beamforming according to 3D beamforming. In detail, as illustrated in FIG. 18(a), when beamforming at an elevation angle is possible, vertical domain sectorization may be possible, and horizontal beamforming may be performed according to an azimuth angle in each vertical sector. In addition, as illustrated in FIG. 18(b), when the elevation angle beamforming is used, a high quality signal may also be transmitted to users positioned to be higher than an antenna of an eNB.

FIG. 19 is a diagram for explanation of examples of vertical beamforming.

In a downtown area, buildings with various heights are distributed. In general, an antenna of an eNB is positioned on a rooftop of the building, and in this regard, the building including the antenna thereon may be lower or higher than surrounding buildings.

FIG. 19(a) illustrates an example of beamforming that considers surrounding buildings higher than the height of the eNB antenna. In this case, there is no obstacle between the eNB antenna and the higher buildings around the eNB, and thus a space channel with a strong line of sight (LOS) component. In addition, in the case of beamforming oriented to a high building, adaptive beamforming based on a height of a building may be a more important factor than horizontal direction adaptive beamforming in the building.

FIG. 19(b) illustrates an example of beamforming that considers surrounding buildings lower than the height of the eNB antenna. In this case, a signal transmitted from the eNB antenna is refracted by a rooftop of the building or reflected by other buildings, the ground, or the like to generate a space channel including a plurality of non-linear of sight (NLOS) components. Accordingly, when the eNB transmits a signal to a user using vertical beamforming directed downward (or toward the ground), a space channel with various paths to be represented by an elevation angle and an azimuth angle may be generated in a specific space (in particular, a place hidden by a building).

Method for Designing Precoding Codebook for Supporting 2D Antenna Configuration

The present invention proposes a method for designing a precoding codebook for appropriately and effectively supporting a scheme such as UE-specific elevation beamforming and vertical sectorization, which can be achieved by a 2D antenna configuration.

In a legacy system, a beam direction may be vertically fixed (i.e., a vertical direction of the beam cannot be selected/adjusted) and beamforming can be performed only in a vertical direction. In order to receive CSI reporting including PMI and so on from the UE for determination of most suitable horizontal beamforming, the eNB may signal a CSI-RS configuration to the UE and transmit a CSI-RS according to the CSI-RS configuration. The signaling of the CSI-RS may be interpreted as providing one or more of information items (e.g., CSI-RS port, CSI-RS transmission timing, and CSI-RS transmission RE position) included in CSI-RS-Config IE of Table 2 above.

For 3D beamforming, vertical beamforming (or selection of vertical beam) as well as already prepared horizontal beamforming is required, and a detailed method therefor has not been defined until now.

For explanation of a basic principle of the present invention, 2D URA (or UPA) may be assumed in the form of a combination of a first domain (e.g., horizontal domain) of ULA and a second domain (e.g., vertical domain) of ULA. For example, an elevation angle in the vertical domain may be determined and then an azimuth angle in the horizontal domain may be determined or an azimuth angle in the horizontal domain may be determined and then an elevation angle in the vertical domain may be determined to form a 3D beam. As such, selection of ULA for any one of the first and second domains in the 2D antenna configuration may be referred to as regional selection or domain selection. As such, vertical beamforming (or elevation angle direction beamforming) along with vertical beamforming (or azimuth angle direction beamforming) may be performed in the 2D antenna configuration.

In a legacy system, a precoding codebook designed for horizontal direction beamforming may be designed to divide an entire range of an azimuth angle with an equivalent interval or to form a given beam direction. For example, a phase of a codebook designed based on discrete Fourier transform (DFT) may be designed in the form of $e^{j2\pi n/N}$, and here, $2\pi/N$ may be interpreted as dividing a phase with an equivalent interval. In addition, the given beam direction may be interpreted as determining the codebook with a given phase value. As such, one of element(s) included in a predetermined codebook may correspond to a specific precoding matrix or a specific beam direction, and the UE may feedback information (e.g., PMI) indicating a specific element to the eNB so as to report a beam direction preferred by the UE to the eNB.

In order to effectively support 2D antenna transmission, the UE may also report PMI for vertical beamforming to the eNB, and to this end, it is required to design a codebook to be used for the vertical beamforming. With regard to codebook design for the vertical beamforming, it is not effective to apply a method for dividing an azimuth angle with an equivalent interval without change like in legacy codebook design. This is because beamforming in the vertical direction frequently forms beams in a direction toward a lower position than an antenna as illustrated in FIG. 18 or 19, and thus it is effective to contain many elements corresponding to beam directions to be most used for codebook design in a codeword. When an elevation angle is also divided with an equivalent interval with respect to codebook design used for vertical beamforming, the number of beam directions to be represented by a codebook is limited, but beamforming weight to be used with low probability may be contained in a codebook element, and thus a number of times of unnecessary calculation may be increased during calculation of an appropriate beamforming weight in the codebook or an inappropriate codebook element that cannot represent an actual beam direction preferred by the UE may be selected/determined. Accordingly, the present invention proposes a codebook designing method for covering the problem.

In addition, in various embodiments of the present invention, a definition of an angle direction may be interpreted as being conformable to the definition of the angle direction described with reference to FIG. 15. However, the scope of the present invention is not limited thereto, and it is obvious that the principle proposed by the present invention is applied to definition of another angle direction in the same way by replacing a value of an angle.

First Embodiment

The first embodiment relates to a method for configuring a precoding matrix (or a precoding vector) for accurately and effectively supporting 3D beamforming in consideration of a correlation of vertical beamforming and horizontal beamforming for a feedback codebook configuration for precoding. In addition, the first embodiment also proposes a method for configuring a codebook so as to form a beam within a specific angle range in an elevation angle direction. For example, this principle may be applied to the case in which a vertical beamforming weight is represented based on direction of arrival (DoA), the case in which a vertical beamforming weight is represented based on DFT, or other cases. In addition, this principle may also be applied to a weight vector for horizontal beamforming.

Embodiment 1

When an elevation angle of 0° is a value indicating a direction perpendicular to an antenna array, a codebook for vertical beamforming may include a weight vector for forming a beam at an elevation angle between −90° to 90°.

Embodiment 1-1

A weight vector for vertical beamforming of 2D antenna array may be represented based on DoA according to Equation 20 below.

$$W_v = e^{j \cdot 2\pi \cdot m \cdot d_v \cdot \sin(\Theta)/\lambda}/\sqrt{M}$$ [Equation 20]

In Equation 20 above, Wv refers to a weight vector for vertical beamforming. M refers to the number of antennas in a vertical domain, m refers to an antenna number (or an antenna index) in the vertical domain (e.g., m=0, 1, . . . , M−1), dv refers to a distance between antennas in the vertical domain, λ refers to a wavelength, and θ refers to an elevation angle.

When an elevation angle has a value of −90° to 90°, a weight vector parameter θ may satisfy the range of −90°≤θ≤90°, and thus sin(θ) may have a value within the range of −1≤sin(θ)≤1.

Embodiment 1-2

A weight vector for horizontal beamforming of 2D antenna array may be represented based on DoA according to Equation 21 below.

$$W_h = e^{j \cdot 2\pi \cdot n \cdot d_h \cdot \cos(\Theta) \cdot \sin(\phi)/\lambda}/\sqrt{N}$$ [Equation 21]

In Equation 21 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, θ refers to an elevation angle, and ψ refers to an azimuth angle.

When an elevation angle has a value of −90° to 90°, a weight vector parameter θ may satisfy the range of −90°≤θ≤90°, and thus cos(θ) may have a value within the range of 0≤cos(θ)≤1.

When an azimuth angle has a value of −180° to 180° (a value of −90° to 90°), a weight vector parameter ψ may satisfy the range of −180°≤ψ≤180° (or −90°≤ψ≤90°), and thus sin(ψ) may have a value within the range of −1≤sin(ψ)≤1.

Embodiment 1-3

A weight vector for vertical beamforming of 2D antenna array may be represented based on DFT according to Equation 22 below.

$$W_v = e^{j \cdot 2\pi \cdot m \cdot k/K}/\sqrt{M}$$ [Equation 22]

In Equation 22 above, Wv refers to a weight vector for vertical beamforming. M refers to the number of antennas in a vertical domain, and m refers to an antenna number (or an antenna index) in the vertical domain (e.g., m=0, 1, . . . , M−1). K refers to the number of beams in the vertical domain, and k refers to a beam number (or a beam index) in the vertical domain. When an elevation angle has a value of −90° to 90°, k has a value of 0 to K (e.g., k=0, 1, . . . , K−1).

In Equation 20 of Embodiment 1-1 based on DoA, if dv=λ/2, Wv may be represented by Wv=exp(j×π×m×sin(θ))/sqrt(M). Here, if −90°≤θ≤90°, −1≤sin(θ)≤1. In Equation 22 of Embodiment 1-3 based on DFT, considering that 2k/K has a value of 0 to 2 according to a beam index k, a correlation between a range of an elevation angle θ in the DoA-based method and a beam index k in the DFT-based method.

When k=0, 1, . . . , K/2 in the DFT-based method, 2k/K may have a value of 0 to 1. Here, the range of 2k/K is the same as the range (i.e., 0≤sin(θ)≤1) of sin(θ) when an elevation angle θ has the range of 0°≤θ≤90°.

In addition, when k=K/2, K/2+1, . . . , K, 2k/K may have a value of 1 to 2. Here, assuming that A=π×2k/K, A may have the range of π to 2π. In addition, in view of exp(jA), exp(jA) when A has the range of π to 2π may be the same as exp(jA) when A has the range of −π to 0. This is the same as in the case in which 2k/K has a value of −1 to 0. Here, the range of 2k/K is the same as the range (i.e., −1≤sin(θ)≤0) of sin(θ) when an elevation angle θ has the range of −90°≤θ≤0°.

In summary, in the DoA-based method, setting of the elevation angle θ to the range of 0°≤θ≤90° may correspond to setting of a beam index k to the range of 0 to K/2 in the DFT-based method.

In addition, in the DoA-based method, setting of the elevation angle θ to the range of −90°≤θ≤0° may correspond to setting of a beam index k to the range of K/2 to K in the DFT-based method.

Embodiment 1-4

A weight vector for horizontal beamforming of 2D antenna array may be represented based on DFT according to Equation 23 below.

$$W_h = e^{j \cdot 2\pi \cdot n \cdot h/H}/\sqrt{N}$$ [Equation 23]

In Equation 23 above, Wh refers to a weight vector for horizontal beamforming. N refers to the number of antennas in a horizontal domain, and n refers to an antenna number (or an antenna index) in the horizontal domain. H refers to the number of beams in the horizontal domain, and h refers to a beam number (or a beam index) in the horizontal domain. c is determined according to a beam index for vertical beamforming.

When an azimuth angle has a value within the range of −180° to 180° (or a value within the range of −90° to 90°), n may have a value of 0 to N (e.g., n=0, 1, . . . , N−1).

When a vertical beam index k has a value of 0 to K, c may be set with a value of 0 to 1.

In detail, as in Embodiment 1-3 above, when an elevation angle θ has a value within the range of −90°≤θ≤90°, a weight vector parameter k for vertical beamforming may have a value of 0 to K. A weight vector for horizontal beamforming may include a value (i.e., c) determined according to a beam index selected in the vertical beamforming, and the value may be defined according to Equation 24 below.

$$c = \sqrt{1-(2k/K-1)^2}$$ [Equation 24]

As shown in Equation 24 above, in the present invention, c may be interpreted as a coefficient or parameter for satisfying $\sin^2(\theta)+\cos^2(\theta)=1$, and from this point of view, $\sin(\theta)$ may correspond to k and $\cos(\theta)$ may correspond to c.

Accordingly, an appropriate angle ψ in a horizontal domain may be selected according to an angle θ selected in a vertical domain. When an azimuth angle is selected in consideration of only a horizontal domain separately (irrespectively or independently) from the elevation angle selected in the vertical domain, if beamforming of an elevation angle direction is actually applied, an originally selected azimuth angle direction cannot mostly ensure optimum performance. Accordingly, for more accurate beamforming, an appropriate angle ψ in a horizontal domain may be selected according to an angle θ selected in a vertical domain (in consideration of θ or dependently upon θ).

Accordingly, according to the present invention, a precoding codebook including weight vector(s) using c may be designed, and thus CSI feedback including precoding information may be more accurately and effectively performed in view of a UE, and precoding (or beamforming) may be more accurately and effectively performed in view of an eNB.

Embodiment 1-5

A weight vector for horizontal beamforming of 2D antenna array may be represented based on DoA according to Equation 25 below.

$$W_h = e^{j \cdot 2\pi \cdot n \cdot d_h \cdot \sin(\Phi)/\lambda}/\sqrt{N}$$ [Equation 25]

In Equation 25 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, and ψ refers to an azimuth angle.

When an azimuth angle has a value within the range of −180° to 180° (or the range of −90° to 90°), a weight vector parameter ψ may be within the range of −180°≤ψ≤180° (or −90°≤ψ≤90°), and thus sin(ψ) may be within the range of −1≤sin(ψ)≤1.

Embodiment 1-5 corresponds to the case in which θ=0° is assumed in Embodiment 1-2. From this point of view, Embodiment 1-5 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

Embodiment 1-6

A weight vector for horizontal beamforming for 2D antenna array may be represented based on DFT according to Equation 26 below.

$$W_h = e^{j \cdot 2\pi \cdot n \cdot h/H}/\sqrt{N}$$ [Equation 26]

In Equation 26 above, Wh refers to a weight vector for horizontal beamforming. N refers to the number of antennas in a horizontal domain, and n refers to an antenna number (or an antenna index) in the horizontal domain. H refers to the number of beams in the horizontal domain and h refers to a beam number (or a beam index) in the horizontal domain.

When the azimuth angle has a value within the range of −180° to 180° (or the range of −90° to 90°), n may have a value within the range of 0 to N (e.g., n=0, 1, . . . , N−1).

Embodiment 1-6 may correspond to the case in which c is assumed to be 1 in Embodiment 1-4. From this point of view, Embodiment 1-6 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

Embodiment 2

When an elevation angle of 0° is a value indicating a direction perpendicular to an antenna array, a codebook for vertical beamforming may include a weight vector for forming a beam at an elevation angle between 0° and 90°.

Embodiment 2-1

A weight vector for vertical beamforming of 2D antenna array may be represented based on DoA according to Equation 27 below.

$$W_v = e^{j \cdot 2\pi \cdot m \cdot d_v \cdot \sin(\Theta)/\lambda}/\sqrt{M}$$ [Equation 27]

In Equation 27 above, Wv refers to a weight vector for vertical beamforming. M refers to the number of antennas in a vertical domain, m refers to an antenna number (or an antenna index) in the vertical domain (e.g., m=0, 1, . . . , M−1), dv refers to a distance between antennas in the vertical domain, λ refers to a wavelength, and θ refers to an elevation angle.

When an elevation angle has a value of 0° to 90°, a weight vector parameter θ may satisfy the range of 0°≤θ≤90°, and thus sin(θ) may have a value within the range of 0≤sin(θ)≤1.

Embodiment 2-2

A weight vector for horizontal beamforming of 2D antenna array may be represented based on DoA according to Equation 28 below.

$$W_h = e^{j \cdot 2\pi \cdot n \cdot d_h \cdot \cos(\Theta) \cdot \sin(\Phi)/\lambda}/\sqrt{N}$$ [Equation 28]

In Equation 28 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, θ refers to an elevation angle, and ψ refers to an azimuth angle.

When an elevation angle has a value of 0° to 90°, a weight vector parameter θ may satisfy the range of 0°≤θ≤90°, and thus cos(θ) may have a value within the range of 0≤cos(θ) ≤1.

When an azimuth angle has a value of −180° to 180° (a value of −90° to 90°), a weight vector parameter ψ may satisfy the range of −180°≤ψ≤180° (or −90°≤ψ≤90°), and thus sin(ψ) may have a value within the range of −1≤sin (ψ)≤1.

Embodiment 2-3

A weight vector for vertical beamforming of 2D antenna array may be represented based on DFT according to Equation 29 below.

$$W_v = e^{j \cdot 2\pi \cdot m \cdot k / K} / \sqrt{M} \quad \text{[Equation 29]}$$

Equation 29 above, Wv refers to a weight vector for vertical beamforming. M refers to the number of antennas in a vertical domain, and m refers to an antenna number (or an antenna index) in the vertical domain (e.g., m=0, 1, . . . , M−1). K refers to the number of beams in the vertical domain, and k refers to a beam number (or a beam index) in the vertical domain. When an elevation angle has a value of 0° to 90°, k has a value of 0 to K/2 (e.g., k=0, 1, . . . , K/2−1).

In Equation 27 of Embodiment 2-1 based on DoA, if dv=λ/2, Wv may be represented by Wv=exp(j×π×m×sin (θ))/sqrt(M). Here, if 0°≤θ≤90°, 0≤sin(θ)≤1. In Equation 29 of Embodiment 2-3 based on DFT, considering that 2k/K has a value of 0 to 2 according to a beam index k, a correlation between a range of an elevation angle θ in the DoA-based method and a beam index k in the DFT-based method.

When k=0, 1, . . . , K/2 in the DFT-based method, 2k/K may have a value of 0 to 1. Here, the range of 2k/K is the same as the range (i.e., 0≤sin(θ)≤1) of sin(θ) when an elevation angle θ has the range of 0°≤θ≤90°.

Accordingly, in the DoA-based method, setting of the elevation angle θ to the range of 0°≤θ≤90° may correspond to setting of a beam index k to the range of 0 to K/2 in the DFT-based method.

Embodiment 2-4

A weight vector for horizontal beamforming of 2D antenna array may be represented based on DFT according to Equation 30 below.

$$W_h = e^{j \cdot 2\pi \cdot n \cdot c \cdot h / H} / \sqrt{N} \quad \text{[Equation 30]}$$

In Equation 30 above, Wh refers to a weight vector for horizontal beamforming. N refers to the number of antennas in a horizontal domain, and n refers to an antenna number (or an antenna index) in the horizontal domain. H refers to the number of beams in the horizontal domain, and h refers to a beam number (or a beam index) in the horizontal domain. c is determined according to a beam index for vertical beamforming.

When an azimuth angle has a value within the range of −180° to 180° (or a value within the range of −90° to 90°), n may have a value of 0 to N (e.g., n=0, 1, . . . , N−1).

When a vertical beam index k has a value of 0 to K/2, c may be set with a value of 0 to 1.

In detail, as in Embodiment 2-3, when an elevation angle θ has a value within the range of 0°≤θ≤90°, a weight vector parameter k for vertical beamforming may have a value of 0 to K/2. A weight vector for horizontal beamforming may include a value (i.e., c) determined according to a beam index selected in the vertical beamforming, and the value may be defined according to Equation 31 below.

$$c = \sqrt{1 - (2k/K - 1)^2} \quad \text{[Equation 31]}$$

As shown in Equation 31 above, c may be interpreted as a coefficient or parameter for selecting an appropriate angle ψ in a horizontal domain according to an angle θ selected in a vertical domain (in consideration of θ or dependently upon θ).

As in the present embodiment, when an elevation angle is limited (e.g., 0°≤θ≤90°), c may be simply set to 1 (or elevation angle θ=0° may be assumed) so as to reduce complexity of calculation of a UE. Hereinafter, these examples will be described.

Embodiment 2-5

A weight vector for horizontal beamforming of 2D antenna array may be represented based on DoA according to Equation 32 below.

$$W_h = e^{j \cdot 2\pi \cdot n \cdot d_h \sin(\Phi)/\lambda} / \sqrt{N} \quad \text{[Equation 32]}$$

In Equation 32 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, and ψ refers to an azimuth angle.

When an azimuth angle has a value within the range of −180° to 180° (or the range of −90° to 90°), a weight vector parameter ψ may be within the range of −180°≤ψ≤180° (or −90°≤ψ≤90°), and thus sin(ψ) may be within the range of −1≤sin(ψ)≤1.

Embodiment 2-5 corresponds to the case in which θ=0° is assumed in Embodiment 2-2. From this point of view, Embodiment 2-5 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

Embodiment 2-6

A weight vector for horizontal beamforming for 2D antenna array may be represented based on DFT according to Equation 33 below.

$$W_h = e^{j \cdot 2\pi \cdot n \cdot h / H} / \sqrt{N} \quad \text{[Equation 33]}$$

In Equation 33 above, Wh refers to a weight vector for horizontal beamforming. N refers to the number of antennas in a horizontal domain, and n refers to an antenna number (or an antenna index) in the horizontal domain. H refers to the number of beams in the horizontal domain and h refers to a beam number (or a beam index) in the horizontal domain.

When the azimuth angle has a value within the range of −180° to 180° (or the range of −90° to 90°), n may have a value within the range of 0 to N (e.g., n=0, 1, . . . , N−1).

Embodiment 2-6 may correspond to the case in which c is assumed to be 1 in Embodiment 2-4. From this point of view, Embodiment 1-6 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

Embodiment 3

When an elevation angle of 0° is a value indicating a direction perpendicular to an antenna array, a codebook for vertical beamforming may include a weight vector for forming a beam at an elevation angle between −90° to 0°.

Embodiment 3-1

A weight vector for vertical beamforming of 2D antenna array may be represented based on DoA according to Equation 34 below.

$$W_v = e^{j \cdot 2\pi \cdot m \cdot d_v \cdot \sin(\Theta)/\lambda} / \sqrt{M} \qquad \text{[Equation 34]}$$

In Equation 34 above, Wv refers to a weight vector for vertical beamforming. M refers to the number of antennas in a vertical domain, m refers to an antenna number (or an antenna index) in the vertical domain (e.g., m=0, 1, . . . , M−1), dv refers to a distance between antennas in the vertical domain, refers to a wavelength, and θ refers to an elevation angle.

When an elevation angle has a value of −90° to 0°, a weight vector parameter θ may satisfy the range of −90°≤θ≤0°, and thus sin(θ) may have a value within the range of −1≤sin(θ)≤0.

Embodiment 3-2

A weight vector for horizontal beamforming of 2D antenna array may be represented based on DoA according to Equation 35 below.

$$W_h = e^{j \cdot 2\pi \cdot n \cdot d_h \cdot \cos(\Theta) \cdot \sin(\phi)/\lambda} / \sqrt{N} \qquad \text{[Equation 35]}$$

In Equation 35 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, θ refers to an elevation angle, and ω refers to an azimuth angle.

When an elevation angle has a value of 0° to 90°, a weight vector parameter θ may satisfy the range of −90°≤θ≤0°, and thus cos(θ) may have a value within the range of 0≤cos(θ)≤1.

When an azimuth angle has a value of −180° to 180° (or a value of −90° to 90°), a weight vector parameter ψ may satisfy the range of −180°≤ψ≤180° (or −90°≤ψ≤90°), and thus sin(ψ) may have a value within the range of −1≤sin(ψ)≤1.

Embodiment 3-3

A weight vector for vertical beamforming of 2D antenna array may be represented based on DFT according to Equation 36 below.

$$W_v = e^{j \cdot 2\pi \cdot m \cdot k/K} / \sqrt{M} \qquad \text{[Equation 36]}$$

In Equation 36 above, Wv refers to a weight vector for vertical beamforming. M refers to the number of antennas in a vertical domain, and m refers to an antenna number (or an antenna index) in the vertical domain (e.g., m=0, 1, . . . , M−1). K refers to the number of beams in the vertical domain, and k refers to a beam number (or a beam index) in the vertical domain. When an elevation angle has a value of 0° to 90°, k has a value of K/2 to K (e.g., k=K/2, K/2+1, . . . , K−1).

In Equation 34 of Embodiment 3-1 based on DoA, if dv=λ/2, Wv may be represented by Wv=exp(j×π×m×sin(θ))/sqrt(M). Here, if −90°≤θ≤0°, −1≤sin(θ)≤0. In Equation 36 of Embodiment 3-3 based on DFT, considering that 2k/K has a value of 1 to 2 according to a beam index k, a correlation between a range of an elevation angle θ in the DoA-based method and a beam index k in the DFT-based method.

When k=K/2, K/2+1, . . . , K in the DFT-based method, 2k/K may have a value of 1 to 2. Here, assuming that A=π×2k/K, A may be a value within the range of π to 2π. In addition, in view of exp(jA), exp(jA) when A has the range of π to 2π may be the same as exp(jA) when A has the range of −π to 0. This is the same as in the case in which 2k/K has a value of −1 to 0. Here, the range of 2k/K is the same as the range (i.e., −1≤sin(θ)≤0) of sin(θ) when an elevation angle θ has the range of −90°≤θ≤0°.

In summary, in the DoA-based method, setting of the elevation angle θ to the range of −90°≤θ≤0° may correspond to setting of a beam index k to the range of K/2 to K in the DFT-based method.

Embodiment 3-4

A weight vector for horizontal beamforming of 2D antenna array may be represented based on DFT according to Equation 37 below.

$$W_h = e^{j \cdot 2\pi \cdot n \cdot c \cdot h} / \sqrt{N} \qquad \text{[Equation 37]}$$

In Equation 37 above, Wh refers to a weight vector for horizontal beamforming. N refers to the number of antennas in a horizontal domain, and n refers to an antenna number (or an antenna index) in the horizontal domain. H refers to the number of beams in the horizontal domain, and h refers to a beam number (or a beam index) in the horizontal domain. c is determined according to a beam index for vertical beamforming.

When an azimuth angle has a value within the range of −180° to 180° (or a value within the range of −90° to 90°), n may have a value of 0 to N (e.g., n=0, 1, . . . , N−1).

When a vertical beam index k has a value of K/2 to K, c may be set with a value of 1 to 0.

In detail, as in Embodiment 3-3 above, when an elevation angle θ has a value within the range of −90°≤θ≤0°, a weight vector parameter k for vertical beamforming may have a value of K/2 to K. A weight vector for horizontal beamforming may include a value (i.e., c) determined according to a beam index selected in the vertical beamforming, and the value may be defined according to Equation 38 below.

$$c = \sqrt{1 - (2k/K - 1)^2} \qquad \text{[Equation 38]}$$

As shown in Equation 38 above, c may be interpreted as a coefficient or parameter for selecting an appropriate angle ψ in a horizontal domain according to an angle θ selected in a vertical domain (in consideration of θ or dependently upon θ).

As in the present embodiment, when an elevation angle is limited (e.g., −90°≤θ≤0°), c may be simply set to 1 (or elevation angle θ=0° may be assumed) so as to reduce complexity of calculation of a UE. Hereinafter, these examples will be described.

Embodiment 3-5

A weight vector for horizontal beamforming of 2D antenna array may be represented based on DoA according to Equation 39 below.

$$W_h = e^{j \cdot 2\pi \cdot n \cdot d_h \cdot \sin(\phi)/\lambda} / \sqrt{N} \qquad \text{[Equation 39]}$$

In Equation 39 above, Wh refers to a weight vector for horizontal beamforming. N refers to the number of antennas in a horizontal domain, n refers to an antenna number (or an antenna index) in the horizontal domain (e.g., n=0, 1, . . . , N−1), and dh refers to a distance between antennas in the horizontal domain. λ refers to a wavelength, and ψ refers to an azimuth angle.

When an azimuth angle has a value within the range of −180° to 180° (or the range of −90° to 90°), a weight vector parameter ψ may be within the range of −180°≤ψ≤180° (or −90°≤ψ≤90°), and thus sin(ψ) may be within the range of −1≤sin(ψ)≤1.

Embodiment 3-5 corresponds to the case in which θ=0° is assumed in Embodiment 3-2. From this point of view, Embodiment 3-5 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

Embodiment 3-6

A weight vector for horizontal beamforming for 2D antenna array may be represented based on DFT according to Equation 40 below.

$$W_h = e^{j \cdot 2\pi \cdot n \cdot h / H} / \sqrt{N}$$ [Equation 40]

In Equation 40 above, Wh refers to a weight vector for horizontal beamforming. N refers to the number of antennas in a horizontal domain, and n refers to an antenna number (or an antenna index) in the horizontal domain. H refers to the number of beams in the horizontal domain and h refers to a beam number (or a beam index) in the horizontal domain.

When the azimuth angle has a value within the range of −180° to 180° (or the range of −90° to 90°), n may have a value within the range of 0 to N (e.g., n=0, 1, . . . , N−1).

Embodiment 3-6 may correspond to the case in which c is assumed to be 1 in Embodiment 3-4. From this point of view, Embodiment 1-6 may correspond to a method for selecting an azimuth angle without consideration of an elevation angle (or assuming that an elevation angle is 0°), and thus even if accuracy in an actual beam direction is slightly degraded, the method may be an effective method in terms of reduction in complexity of calculation of a UE.

In the aforementioned precoding codebook configuration method proposed by the present invention, the following feature may be additionally considered.

When a precoding matrix (or a precoding vector) included in a precoding codebook is configured, resolution of vertical beamforming may be differently set according to a value of an elevation angle (or the range of an elevation angle). In reality, considering that a space for placing a physical antenna array is a rooftop of a high building, it is expected that the case (e.g., the case shown in FIG. 19(b)) in which an antenna array is placed higher than a target position for signal transmission and reception occurs more frequently than an opposite case (e.g., the case shown in FIG. 19(a)). In addition, when an antenna array is placed higher than a target position for signal transmission and reception (e.g., the case shown in FIG. 19(b)), considering refraction, reflection, and so on due to various obstacles, there is a need for more precisely adjusting a beam direction than the opposite case (e.g., the case shown in FIG. 19(a)).

Considering this point, when an elevation angle 0° indicates a direction perpendicular to an antenna array, if the elevation angle is a value within the range −90° to 90° (or 0° to 90°), a precoding codebook may be designed in such a way that, as the elevation angle is closer to 90° (i.e., is directed downward from the antenna array), vertical beamforming has denser resolution, and as the elevation angle is closer to an opposite angle (−90° or 0°), vertical beamforming has sparser resolution. That is, in a precoding codebook including a precoding weight vector/matrix for vertical beamforming, resolution of the precoding weight vector/matrix for vertical beamforming may be configured to be lower when the elevation angle is close to 0° than in the case in which the elevation angle is close to 90°. In addition, in the precoding codebook, the number of precoding matrices (or precoding vectors) corresponding to about 90° of an elevation angle 90° may be greater than the number of precoding matrices (or precoding vectors) corresponding to about −90° (or 0°) of an elevation angle.

In addition, when a precoding matrix (or a precoding vector) included in a precoding codebook is configured, resolution of horizontal beamforming may be differently set according to a value of an elevation angle (or the range of an elevation angle). For the same reason as the aforementioned reason, it may be advantageous to more precisely set a beam direction as an elevation angle is closer to 90°, and thus a precoding codebook may be designed in such a way that, as the elevation angle is closer to 90° (i.e., is directed downward from the antenna array), horizontal beamforming has denser resolution, and as the elevation angle is closer to an opposite angle (−90° or 0°), horizontal beamforming has sparser resolution. That is, in a precoding codebook including a precoding weight vector/matrix for horizontal beamforming, resolution of the precoding weight vector/matrix for horizontal may be configured to be higher when the elevation angle has a value of 0° to 90° than in the case in which the elevation angle has a value of −90° to 0°. For example, resolution of horizontal beamforming for the case in which the elevation angle has a value of 0° to 90° may be denser, and resolution of horizontal beamforming for the case in which the elevation angle has a value of −90° to 0° may be sparser.

Second Embodiment

The second embodiment relates to a method for configuring a codebook set including a precoding weight vector for horizontal beamforming and a precoding weight vector for vertical beamforming.

Embodiment 1

The present embodiment proposes a method for configuring a codebook for vertical-horizontal beamforming.

A precoding weight vector (or a precoding weight matrix) for 3D beamforming may be determined or indicated by a combination of two indicators (or two PMI). The two indicators may be referred to as, for example, $I_1$ and $I_2$. $I_1$ and $I_2$ may be simultaneously reported or may be reported at different time points for reduction in feedback overhead. Here, $I_1$ may be reported at a long term and applied to a wideband.

Embodiment 1-1

Each of one or more elements included in a codebook may be designed to include both a weight vector/matrix for vertical beamforming and a weight vector/matrix for horizontal beamforming.

Embodiment 1-2

A precoder set indicated by a first indicator (e.g., $I_1$) may include one weight vector/matrix for vertical beamforming and one or more candidate weight vector/matrices for horizontal beamforming. Different vertical beamforming weight vectors/matrixes may be determined by different values of a first indicator $I_1$ and the same horizontal beamforming weight vector/matrix may correspond to the different value of the first indicators $I_1$.

For example, a precoder vector/matrix for 3D beamforming may be configured by a first indicator $I_1$ and a second indicator $I_2$ as shown in Table 15 below.

TABLE 15

| | $I_2$ | | | |
|---|---|---|---|---|
| $I_1$ | 0 | 1 | 2 | 3 |
| 0 | Wv(0), Wh(0) | Wv(0), Wh(1) | Wv(0), Wh(2) | Wv(0), Wh(3) |
| 1 | Wv(1), Wh(0) | Wv(1), Wh(1) | Wv(1), Wh(2) | Wv(1), Wh(3) |
| 2 | Wv(2), Wh(0) | Wv(2), Wh(1) | Wv(2), Wh(2) | Wv(2), Wh(3) |
| 3 | Wv(3), Wh(0) | Wv(3), Wh(1) | Wv(3), Wh(2) | Wv(3), Wh(3) |

In an example of Table 15 above, $I_1=0$ may indicate Wv(0) as one weight vector/matrix for vertical beamforming and indicate Wh(0), Wh(1), Wh(2), and Wh(3) as four candidates for horizontal beamforming. In addition, according to a value of $I_2$, any one of the four horizontal beamforming weight vector/matrix candidates may be specified. With regard to other values of $I_1$, one of weight vectors/matrixes for vertical beamforming may be indicated and one of weight vectors/matrices for horizontal beamforming may be indicated by a combination with $I_2$, in a similar method.

Embodiment 1-3

A precoder set indicated by a first indicator (e.g., $I_1$) may include some of one or more candidate weight vector/matrices for vertical beamforming and all of one or more candidate weight vector/matrices for horizontal beamforming. Vertical beamforming weight vectors/matrices corresponding to a first value of the first indicator $I_1$ may overleap some of vertical beamforming weight vectors/matrices corresponding to a second value. The same horizontal beamforming weight vector/matrix may correspond to different values of the first indicator $I_1$.

For example, a precoder vector/matrix for 3D beamforming may be specified by a first indicator $I_1$ and a second indicator $I_2$ as shown in Table 16 below.

TABLE 16

| | $I_2$ | | | | | | | |
|---|---|---|---|---|---|---|---|---|
| $I_1$ | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(1), Wh(0) | Wv(1), Wh(1) | Wv(1), Wh(2) | Wv(1), Wh(3) | Wv(2), Wh(0) | Wv(2), Wh(1) | Wv(2), Wh(2) | Wv(2), Wh(3) |
| 2 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 3 | Wv(3), Wh(0) | Wv(3), Wh(1) | Wv(3), Wh(2) | Wv(3), Wh(3) | Wv(0), Wh(0) | Wv(0), Wh(1) | Wv(0), Wh(2) | Wv(0), Wh(3) |

In an example of Table 16 above, $I_1=0$ may indicate Wv(0) and Wv(1) as two weight vectors/matrices for vertical beamforming and indicate Wh(0), Wh(1), Wh(2), and Wh(3) as four candidate weight vectors/matrices for horizontal beamforming. In addition, according to a value of $I_2$, any one of Wv(0) and Wv(1) as two weight vectors/matrices for vertical beamforming and any one of four horizontal beamforming weight vector/matrix candidates may be specified. With regard to other values of $I_1$, two (candidate) vertical beamforming weight vectors/matrices may be determined, one vertical beamforming weight vector/matrix may be finally indicated by a combination with $I_2$, and one of horizontal beamforming weight vectors/matrices may be indicted, in a similar method.

Embodiment 1-4

A precoder set indicated by a first indicator (e.g., $I_1$) may include some of one or more candidate weight vector/matrices for vertical beamforming and all of one or more candidate weight vector/matrices for horizontal beamforming. Vertical beamforming weight vectors/matrices may not overlap each other and different vertical beamforming weight vectors/matrices may be determined according to different values of the first indicator E. Different values of the first indicator $I_1$ may correspond to the same horizontal beamforming weight vector/matrix.

For example, a precoder vector/matrix for 3D beamforming may be specified by a first indicator $I_1$ and a second indicator $I_2$ as shown in Table 17 below.

TABLE 17

| $I_1$ | $I_2$ | | | | | | | |
|---|---|---|---|---|---|---|---|---|
| | 0 | 1 | 2 | 3 | 4 | 5 | 6 | 7 |
| 0 | Wv(0), Wh(0) | Wv(0), Wh(1) | Wv(0), Wh(2) | Wv(0), Wh(3) | Wv(1), Wh(0) | Wv(1), Wh(1) | Wv(1), Wh(2) | Wv(1), Wh(3) |
| 1 | Wv(2), Wh(0) | Wv(2), Wh(1) | Wv(2), Wh(2) | Wv(2), Wh(3) | Wv(3), Wh(0) | Wv(3), Wh(1) | Wv(3), Wh(2) | Wv(3), Wh(3) |
| 2 | Wv(4), Wh(0) | Wv(4), Wh(1) | Wv(4), Wh(2) | Wv(4), Wh(3) | Wv(5), Wh(0) | Wv(5), Wh(1) | Wv(5), Wh(2) | Wv(5), Wh(3) |
| 3 | Wv(6), Wh(0) | Wv(6), Wh(1) | Wv(6), Wh(2) | Wv(6), Wh(3) | Wv(7), Wh(0) | Wv(7), Wh(1) | Wv(7), Wh(2) | Wv(7), Wh(3) |

In an example of Table 17 above, $I_1=0$ may indicate Wv(0) and Wv(1) as two weight vectors/matrices for vertical beamforming and indicate Wh(0), Wh(1), Wh(2), and Wh(3) as four candidate weight vectors/matrices for horizontal beamforming. In addition, according to a value of $I_2$, any one of Wv(0) and Wv(1) as two weight vectors/matrices for vertical beamforming and any one of four horizontal beamforming weight vector/matrix candidates may be specified. With regard to other values of $I_1$, two (candidate) vertical beamforming weight vectors/matrices may be determined, one vertical beamforming weight vector/matrix may be finally indicated by a combination with $I_2$, and one of horizontal beamforming weight vectors/matrices may be indicted, in a similar method.

Embodiment 1-5

A precoder set indicated by a first indicator (e.g., $I_1$) may include some of one or more candidate weight vector/matrices for vertical beamforming and some of one or more candidate weight vector/matrices for horizontal beamforming. Vertical beamforming weight vectors/matrices corresponding to a first value of the first indicator $I_1$ may partially or entirely overlap with vertical beamforming weight vectors/matrices corresponding to a second value. Horizontal beamforming weight vectors/matrices may not overlap each other and different horizontal beamforming weight vectors/matrices may be determined according to different values of the first indicator $I_1$.

For example, a precoder vector/matrix for 3D beamforming may be specified by a first indicator $I_1$ and a second indicator $I_2$ as shown in Table 18 below.

TABLE 18

| $I_1$ | $I_2$ | | | |
|---|---|---|---|---|
| | 0 | 1 | 2 | 3 |
| 0 | Wv(0), Wh(0) | Wv(0), Wh(1) | Wv(0), Wh(2) | Wv(0), Wh(3) |
| 1 | Wv(0), Wh(4) | Wv(0), Wh(5) | Wv(0), Wh(6) | Wv(0), Wh(7) |
| 2 | Wv(1), Wh(0) | Wv(1), Wh(1) | Wv(1), Wh(2) | Wv(1), Wh(3) |
| 3 | Wv(1), Wh(4) | Wv(1), Wh(5) | Wv(1), Wh(6) | Wv(1), Wh(7) |

In an example of Table 18 above, $I_1=0$ may indicate Wv(0) as one weight vector/matrix for vertical beamforming and indicate Wh(0), Wh(1), Wh(2), and Wh(3) as four candidate weight vectors/matrices for horizontal beamforming. In addition, according to a value of $I_2$, any one of the four horizontal beamforming weight vector/matrix candidates may be indicated. With regard to other values of $I_1$, one of vertical beamforming weight vectors/matrices may be indicated, and one of horizontal beamforming weight vectors/matrices may be indicted according to a combination with $I_2$, in a similar method.

In the aforementioned various embodiments, a DoA-based or DFT-based precoding weight vector/matrix may be configured according to the method described in Embodiment 1.

A codebook may be designed so as to adaptively change a size of a codebook of a horizontal domain according to a value of PMI of a vertical domain. For example, with regard to Wv(0), seven horizontal domain PMI of Wh(0) to Wh(7) may correspond to Wv(0) to design a large-size codebook, and with regard to Wv(3), two horizontal domain PMI of Wh(0) and Wh(1) may correspond to Wv(3) to design a small-size codebook.

Codebooks with different sizes may be designed according to a value (or a range) of an elevation angle in a vertical direction. For example, a codebook may be designed in such a way that a larger number of vertical and/or horizontal precoding weight matrices/vectors are included with regard to the range of 0° to 45° of an elevation angle (i.e., denser beamforming is supported), and a smaller number of vertical and/or horizontal precoding weight matrices/vectors are included with regard to the range of 45° to 90° of an elevation angle (i.e., sparser beamforming is supported). As an additional example, a codebook may be designed in such a way that a larger number of vertical and/or horizontal precoding weight matrices/vectors are included with regard to the range of 0° to −45° of an elevation angle (i.e., denser beamforming is supported), and a smaller number of vertical and/or horizontal precoding weight matrices/vectors are included with regard to the range of 0° to 90° of an elevation angle (i.e., sparser beamforming is supported). Similarly, a codebook may be designed in such a way that vertical/horizontal precoding weight matrices/vectors are densely or sparsely defined with regard to a specific elevation angle range.

The following embodiments relate to a method for separating and configuring a codebook set for horizontal beamforming and a codebook set for vertical beamforming.

Embodiment 2

The present embodiment relates to a method for configuring a codebook (hereinafter, vertical beamforming codebook) including precoding weight vector/matrix(s) for vertical beamforming.

According to the present embodiment, one specific precoding vector/matrix of a vertical beamforming codebook may be determined or indicated by a combination of two indicators (or two PMI). The two indicators may be referred to as, for example, $V\text{-}I_1$ and $V\text{-}I_2$. $V\text{-}I_1$ and $V\text{-}I_2$ may be simultaneously reported or may be reported at different time points for reduction in feedback overhead. Here, PMI (e.g., V-I$_1$ and/or V-I$_2$) for vertical beamforming may be reported at a long term and applied to a wideband. Alternatively, V-I$_1$ of the PMI for vertical beamforming may be reported at a long term and applied to a wideband compared with V-I$_2$.

As such, when a precoding weight vector/matrix for vertical beamforming is indicated by two indicators, a precoding weight vector/matrix for 3D beamforming may be finally specified by an additional combination of one (or a plurality of) precoding vector/matrix for horizontal beamforming. For example, the precoding weight vector/matrix for 3D beamforming may be indicated by a combination of two V-PMI and one H-PMI.

A vertical beamforming codebook may be configured in such a way that V-PMI (e.g., V-I$_1$ and/or V-I$_2$) indicates a precoding weight vector/matrix configured based on DoA or DFT according to the aforementioned method of the first embodiment.

The size or length of V-PMI (e.g., V-I$_1$ and/or V-I$_2$) may be determined according to the number of antenna ports in a vertical domain.

In addition, vertical beamforming weight vectors/matrices corresponding to a first value of V-I$_1$ may partially or entirely overlap vertical beamforming weight vectors/matrices corresponding to a second value. For example, as shown in Table 19 below, vertical beamforming precoding vectors/matrices may be specified according to V-I$_1$ and V-I$_2$.

TABLE 19

| V-I$_1$ | V-I$_2$ | |
|---|---|---|
| | 0 | 1 |
| 0 | Wv (0) | Wv (1) |
| 1 | Wv (1) | Wv (2) |
| 2 | Wv (2) | Wv (3) |
| 3 | Wv (3) | Wv (0) |

In an example of Table 19 above, V-I$_1$=0 may indicate Wv(0) and Wv(1) as two candidate vectors/matrices for vertical beamforming, and any one of Wv(0) and Wv(1) may be determined according to a value of V-I$_2$. V-I$_1$=1 may indicate Wv(1) and Wv(2) as two candidate weight vectors/matrices for vertical beamforming and any one of Wv(1) and Wv(2) may be determined according to a value of V-I$_2$. With regard to other values of V-I$_1$, a candidate group of weight vectors/matrices for vertical beamforming may be indicated, and a weight vector/matrix for one vertical beamforming of the candidate group may be determined by a combination with V-I$_2$, in a similar method.

When V-I$_1$ and V-I$_2$ are reported at different time points, a reporting period may be determined as follows.

In a correlation between V-I$_1$ and V-I$_2$, V-I$_2$ may be more frequently reported than V-I$_1$ (or a reporting period of V-I$_2$ may be given to be shorter than a reporting period of V-I$_1$).

With respect to a correlation with H-PMI, V-I$_2$ may be more frequently reported than H-PMI (or a reporting period of V-I$_2$ may be given to be shorter than a reporting period of H-PMI). Alternatively, V-I$_2$ may be reported at the same time point as H-PMI.

When H-PMI includes two indicators (e.g., H-I$_1$ and H-I$_2$), H-I$_1$ and V-I$_2$ may be reported at the same time. H-I$_1$ and RI may be reported at the same time. H-I$_1$ may not be simultaneously reported with other PMI or CSI but may be reported alone. In addition, H-I$_1$ and H-I$_2$ may be reported at the same time.

Embodiment 3

The present embodiment relates to another method for configuring a codebook (hereinafter, vertical beamforming codebook) including precoding weight vector/matrix(s) for vertical beamforming.

According to the present embodiment, one specific precoding vector/matrix of a vertical beamforming codebook may be determined or indicated by one indicator (or one PMI). The one indicator may be referred to as, for example, V-I. Here, the PMI (e.g., V-I) for vertical beamforming may be reported at a long term and applied to a wideband.

As such, a precoding weight vector/matrix for vertical beamforming is indicated by one indicator (e.g., V-I), a precoding weight vector/matrix for 3D beamforming may be finally specified by an additional combination of one (or a plurality of) precoding vector/matrix for horizontal beamforming. For example, the precoding weight vector/matrix for 3D beamforming may be indicated by a combination of one V-I and one or more H-PMI (e.g., H-I or H-I$_1$ and H-I$_2$).

A vertical beamforming codebook may be configured in such a way that V-I indicates a precoding weight vector/matrix configured based on DoA or DFT according to the aforementioned method of the first embodiment.

The size or length of V-I may be determined according to the number of antenna ports in a vertical domain.

For example, as shown in Table 20 below, V-I may indicate one specific vertical beamforming precoding weight vector/matrix.

TABLE 20

| V-I | |
|---|---|
| 0 | Wv (0) |
| 1 | Wv (1) |
| 2 | Wv (2) |
| 3 | Wv (3) |

V-I may be reported at a different time point from H-PMI (e.g., H-I or H-I$_1$ and H-I$_2$). In this case, V-I may be reported more frequently than H-PMI (or a reporting period of V-I may be given to be shorter than a reporting period of H-PMI).

As a modified embodiment of the aforementioned embodiments, the vertical beamforming weight vector/matrix and the horizontal beamforming weight vector/matrix may be synthesized to configure a weight vector/matrix for 3D beamforming (i.e., for simultaneously determining vertical beamforming and horizontal beamforming). For example, a codebook may be configured in such a way that one PMI indicates one precoding vector/matrix applied to both a vertical domain and a horizontal domain. The codebook may be configured, and one specific 3D precoding vector/matrix may be indicated by one PMI or a combination of a plurality of PMIs.

Third Embodiment

The third embodiment relates to a method for defining a PUCCH reporting type. In detail, the third embodiment proposes a method for reporting an index of a precoder for vertical beamforming and an index of a precoder for horizontal beamforming when UE-specific vertical beamforming and horizontal beamforming are performed in a MIMO system including an AAS-based 2D array antenna configuration.

A legacy 3GPP LTE system (e.g., 3GPP LTE release-8, 9, 10, and 11) is designed in such a way that a PUCCH resource transmits a maximum of 11 bits to 13 bits. In addition, transmission of rank-2 or more may support two transfer blocks (or two codewords), and two transfer blocks may be mapped to two codewords according to one-to-one correspondence. In addition, CQI may be measured and reported with respect to each transfer block (or codeword). In this case, CQI of a first transfer block (or codeword) may be represented by four bits and CQI of a second transfer block (or codeword) may be represented by three bits, and thus a total of 7 bits are required to report CQI for transmission of two transfer blocks (or two codewords). In addition, in a system to which precoding is applied, when 4 bits are required to report PMI, a maximum of 11 bits may be used in order to simultaneously report precoding and CQI.

A legacy 3GPP LTE system supports only horizontal beamforming, and a reporting method when a PUCCH is used to report CSI for the horizontal beamforming is defined as follows. In particular, a codebook for 8Tx transmission is designed based on two indicators (a first indicator $i_1$ and a second indicator $i_2$), and in this end, the first indicator and the second indicator may be reported using three methods in a PUCCH reporting mode.

A first method is a method for reporting a first indicator $i_1$ and then simultaneously reporting a second indicator $i_2$ and CQI.

A second method is a method for simultaneously reporting a first indicator $i_1$, a second indicator $i_2$, and CQI.

A third method is a method for defining a specific indictor (e.g., precoding type indictor (PTI)) about whether a first indicator $i_1$ is reported and applying different reporting methods according to the specific indicator. When the specific indicator indicates that the first indicator $i_1$ is reported, the first indicator $i_1$ is reported at a predetermined time point and then the second indicator $i_2$ and CQI are simultaneously reported. When the specific indicator indicates that the first indicator $i_1$ is not reported, the second indicator $i_2$ and CQI may be simultaneously reported at a predetermined time point (in this case, since a specific precoding vector/matrix cannot be determined by only the second indicator $i_2$ without the first indicator $i_1$, the pre-reported first indicator $i_1$ may be assumed to be used so as to determine or indicate a specific precoding vector/matrix).

With regard to an enhanced 3GPP LTE system (e.g., after 3GPP LTE release-11), research has been conducted to maximize potential gain for a MIMO system that assumes an AAS-based 2D array antenna configuration. The AAS-based 2D array antenna configuration is different from a legacy system in that vertical domain beamforming can be performed variably and/or UE-specifically. With regard to application of the vertical beamforming, the AAS-based 2D array antenna configuration is different from a legacy system in that a UE selects a vertical domain beam direction that is most appropriate (or preferred) for the UE and reports the selected vertical domain beam direction to an eNB. Hereinafter, a UE operation to be further considered when PMI for vertical beamforming and horizontal beamforming is reported will be proposed.

In the present invention, in the case of CSI reporting through a PUCCH, a specific indicator indicating whether PMI (V-PMI) for vertical beamforming is reported may be defined. The specific indicator may be referred to as a V-PMI reporting type indictor (RTI). The V-PMI RTI may be included in CSI that is transmitted through a PUCCH by a UE. In addition, according to a value of the V-PMI RTI, the UE may or may not report the V-PMI (or a value of the V-PMI RTI may be determined according to whether the UE reports or does not report the V-PMI).

When the V-PMI RTI is set to a first value (or a value indicating On), the V-PMI may be reported after the V-PMI RTI is reported. In this case, the H-PMI may be reported after the V-PMI is reported. Alternatively, the V-PMI and the H-PMI may be reported at the same time. Alternatively, some of the H-PMI along with the V-PMI may be reported at the same time and then the remaining of the H-PMI may be reported (e.g., the V-PMI and the H-PMI$_1$ are simultaneously reported and then the H-PMI$_2$ and CQI may be simultaneously reported).

When the V-PMI RTI is set to a second value (or a value indicating Off), only the H-PMI may be reported without reporting of the V-PMI after the V-PMI RTI is reported. In this case, it may be assumed that a precoder indicated by the most recently reported V-PMI (e.g., the last reported V-PMI prior to report of the V-PMI RTI) is used as a precoder for vertical beamforming without changes. In addition, a precoder indicated by specific V-PMI set as default may be used as the precoder for vertical beamforming. The default V-PMI may be V-PMI with a lowest number (or index).

The V-PMI RTI may be combined with RI and reported. In this case, the V-PMI may be assumed to be selected/determined based on rank-1, and the reported RI may be used to indicate a rank value for reference of selection/determination of the H-PMI (e.g., the RI may indicate a transmission rank value associated with H-PMI to be reported later irrespective of whether a value of the V-PMI RTI indicates On or Off). In addition, the reported RI may be used to indicate a rank value of a precoding vector/matrix indicated by a combination of the V-PMI and the H-PMI (or a precoding vector/matrix obtained as a result of a combination (e.g., Kronecker product) of a precoding vector/matrix indicated by V-PMI and a precoding vector/matrix indicated by the H-PMI).

Alternatively, the V-PMI RTI may be reported prior to RI. In this case, the V-PMI may be assumed to be selected/determined based on rank-1, and the reported RI may be used to indicate a rank value (i.e., a rank value associated with the H-PMI) as a reference for selection/determination of the H-PMI. In addition, a reporting period of the V-PMI RTI may be determined to be an integer multiple of a reporting period of the RI, and reporting of the V-PMI RTI prior to the RI may be indicated as an offset value using a predetermined reporting time point (e.g., a RI reporting time point) as a reference time point.

Fourth Embodiment

The fourth embodiment relates to a method for generating a precoding vector and matrix using two indictors and an operation of a UE when a precoding weight vector for vertical beamforming and a precoding vector for vertical beamforming are used.

When a UE selects a precoder for vertical beamforming and a precoder for horizontal beamforming from a channel measurement signal, the UE may report an indicator of the precoder for vertical beamforming and the precoder for horizontal beamforming to the eNB.

When the precoder for vertical beamforming and the precoder for horizontal beamforming are selected, the UE may measure and report the channel quality of a transmitted signal using the two precoders.

In order to measure a state of a beamformed channel, the UE needs to assume that two precoders are combined and transmitted. In this regard, there is no definition determined between the UE and the eNB to this end, measured and reported channel information may be largely different from actual transmission. Accordingly, in order to accurately measure and report channel, a method for generating a precoder assumed for transmission needs to be defined.

In a first method, when a precoding weight for vertical beamforming is a vector Wv (Nv_Tx×1) and a precoding weight for horizontal beamforming is a vector Wh (Nh_Tx×1), a precoder for transmission may be assumed according to Equations 41 to 44 (here, kronecker product may be defined according to kron([a b;c d],[e f;g h])=[a[e f;g h] b[e f;g h]; c[e f;g h] d[e f;g h]].)

$$W=\text{kron}(Wv,Wh) \quad \text{[Equation 41]}$$

$$W=[Wh\ 0_{Nh\_Tx\times Nv\_Tx-1};\ 0_{Nh\_Tx\times 1}\ Wh$$
$$0_{Nh\_Tx\times Nh\_Tx-2};\ \ldots,\ 0_{Nh\_Tx\times Nv\_Tx-1}$$
$$Wh][Wv(1)\ Wv(2)\ \ldots\ Wv(Nv\_Tx)] \quad \text{[Equation 42]}$$

$$W=\text{kron}(Wh,Wv) \quad \text{[Equation 43]}$$

$$W=[Wv\ 0_{Nv\_Tx\times Nh\_Tx-1};\ 0_{Nv\_Tx\times 1}\ Wv$$
$$0_{Nv\_Tx\times Nh\_Tx-2};\ \ldots,\ 0_{Nv\_Tx\times Nh\_Tx-1}$$
$$Wv][Wh(1)\ Wh(2)\ \ldots\ Wh(Nh\_Tx)] \quad \text{[Equation 44]}$$

In a second method, for high rank transmission, a precoding weight for vertical beamforming may be assumed to be rank-1 and a precoding weight for horizontal beamforming may be assumed to be high rank. In this case, when the precoding weight for vertical beamforming is a vector Wv (Nv_Tx×1) and the precoding weight for horizontal beamforming is a vector Wh (Nh_Tx×r), a precoder for transmission may be assumed according to Equations 45 to 48 below. (r: transmission rank)

$$W=\text{kron}(Wv,Wh) \quad \text{[Equation 45]}$$

$$W=[Wh\ 0_{Nh\_Tx\times Nv\_Tx-1};\ 0_{Nh\_Tx\times 1}\ Wh$$
$$0_{Nh\_Tx\times Nh\_Tx-2};\ \ldots,\ 0_{Nh\_Tx\times Nv\_Tx-1}$$
$$Wh][Wv(1)\ Wv(2)\ \ldots\ Wv(Nv\_Tx)] \quad \text{[Equation 46]}$$

$$W=\text{kron}(Wh,Wv) \quad \text{[Equation 47]}$$

$$W=[Wv\ 0_{Nv\_Tx\times Nh\_Tx-1};\ 0_{Nv\_Tx\times 1}\ Wv$$
$$0_{Nv\_Tx\times Nh\_Tx-2};\ \ldots,\ 0_{Nv\_Tx\times Nh\_Tx-1}$$
$$Wv][Wh(1)\ Wh(2)\ \ldots\ Wh(Nh\_Tx)] \quad \text{[Equation 48]}$$

Fifth Embodiment

The fifth embodiment relates to an antenna port indicting method and an antenna port mapping correlation in a 2D antenna array configuration.

In the present embodiment, a parameter of horizontal domain antenna ports and/or a parameter of vertical domain antenna ports may be configured to be semi-statically indicated.

Embodiment 1

In the present embodiment, when the number (e.g., 1Tx, 2Tx, 4Tx, and 8Tx) of horizontal domain antenna ports is defined (e.g., via RRC signaling) and a parameter (e.g., 1, 2, 4, 8 . . . ) of vertical domain antenna ports is further indicated via RRC signaling, antenna ports may be further mapped in consideration of a received signal. Here, with regard to mapping of the CSI-RS port, priority may be set so as to preferentially map the CSI-RS port based on a horizontal domain and then to map the CSI-RS port based on the horizontal domain. In addition, in the case of an array antenna including a cross-pole antenna pair, with regard to mapping of the CSI-RS port, priority may be set in such a way that antenna ports with the same pole may be completely mapped and then antenna ports with different poles may be mapped.

FIGS. 20 and 21 are diagrams illustrating antenna port mapping according to an embodiment of the present invention.

FIG. 20 illustrates an array antenna including a ULA. FIG. 20A illustrates the case in which a parameter of vertical domain antenna ports further indicates 1 when horizontal domain antennas includes 8 transmit antennas (i.e., 8Tx).

Figure 20A:
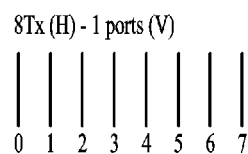
FIGS. 20 to 23 are diagrams for explanation of 2D array antenna mapping.
Figure 20B:
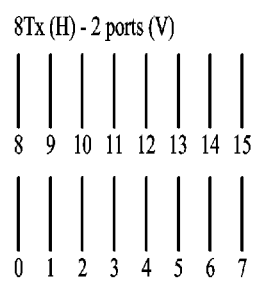
Figure 20C:
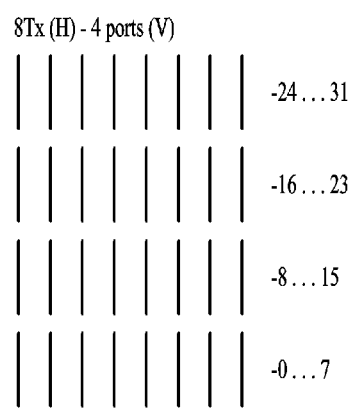
Figure 20D:
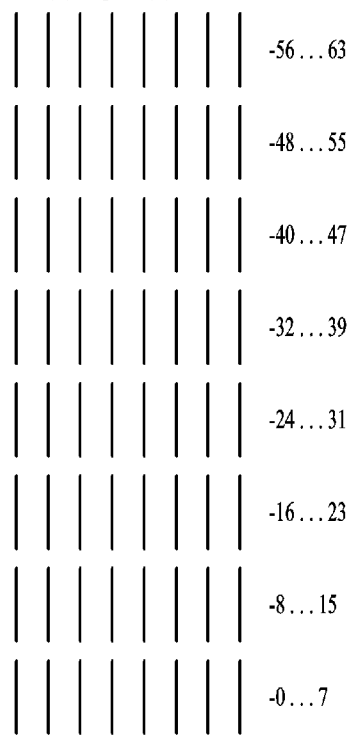

FIGS. 20B to 20D illustrate the case in which parameters of vertical domain antenna ports indicate 2, 4, and 8 and one column or one row includes a ULA when horizontal domain antennas are 8Tx.

Figure 21A:
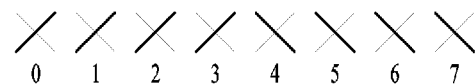

FIG. 21 illustrates an array antenna including a cross-pole antenna pair. FIG. 21A illustrates the case in which a parameter of vertical domain antenna ports further indicates 1 when horizontal domain antennas include 8Tx. Here, in FIG. 21A, the array antenna includes a cross-pole antenna pair, and when a total of 8 Tx antennas are placed, group 1 up to indexes 1, 2, . . . , 8/2 and group 2 up to indexes 8/2+1, 8/2+2, . . . , 8 may be configured to have poles orthogonal to each other.

Figure 21B:
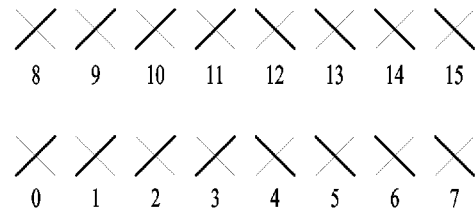
Figure 21C:
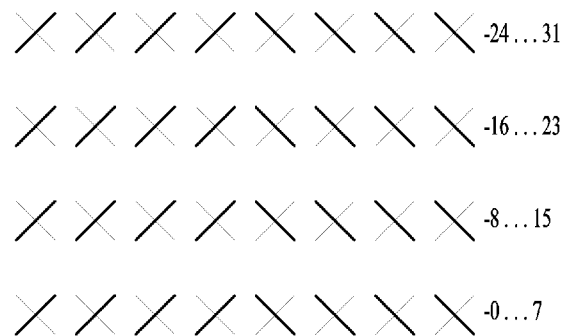

FIGS. 21B to 21D illustrates the case in which parameters of vertical domain antenna ports further indicate 2, 4, and 8 when horizontal domain antennas are 8Tx. In FIG. 21A, as described above, the antenna array includes a cross-pole antenna pair, and thus cross-pole antenna pairs included in one row may have poles orthogonal to each other.

Embodiment 2

In the present embodiment, when parameters (e.g., 16Tx, 32Tx, and 64Tx) of all antenna ports are indicated via RRC signaling and parameters (e.g., 1, 2, 4, and 8) of vertical domain antenna ports are further indicted via RRC signaling, antenna ports may be mapped in consideration of the all received parameters of antenna ports and vertical domain antenna parameter.

FIGS. 22 and 23 are diagrams illustrating antenna port mapping according to an embodiment of the present invention.

Figure 22A:
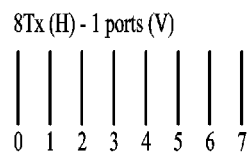

FIG. 22 illustrates an array antenna including a ULA. FIG. 22A illustrates the case in which a parameter of all antenna ports is indicated by 8Tx and a parameter of vertical domain antenna ports is indicated by 1. That is, when a parameter of vertical antenna ports is indicated by 1, all antenna ports are configured as ULAs included in one row.

Figure 22B:
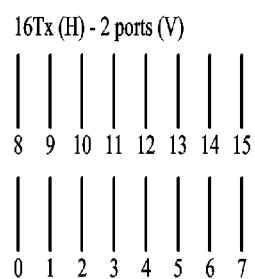
Figure 22C:
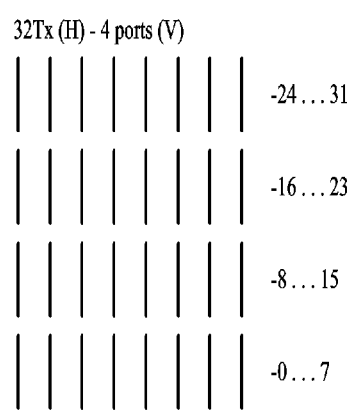

As illustrated in FIG. FIG. 22B, when a parameter of all antenna ports is indicate d by 16Tx and a parameter of vertical domain antenna ports is indicated by 2, all antenna ports may include two rows (including the same antenna parameter). Similarly, FIGS. 22C and 22D illustrate the case in which, when a parameter of antenna ports is indicated by 32Tx and a parameter of vertical domain antenna ports is indicated by 4, a parameter of antenna ports is indicated by 64Tx and a parameter of vertical domain antenna ports is indicated by 4.

FIG. 23 illustrates an array antenna including a cross-pole antenna pair. FIG. 23A illustrates the case in which a parameter of all antennas is indicated by 8Tx and a parameter of vertical domain antenna ports is further indicated by 1. Here, in FIG. 23A, since the antenna array includes a cross-pole antenna pair, and when a total of 8 Tx antennas are placed, group 1 up to indexes 1, 2, . . . , 8/2 and group 2 up to indexes 8/2+1, 8/2+2, . . . , 8 may be configured to have poles orthogonal to each other.

Figure 23A:
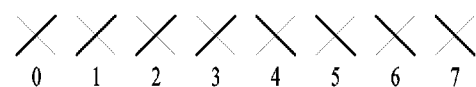
Figure 23B:
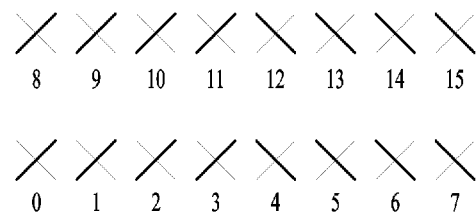
Figure 23C:
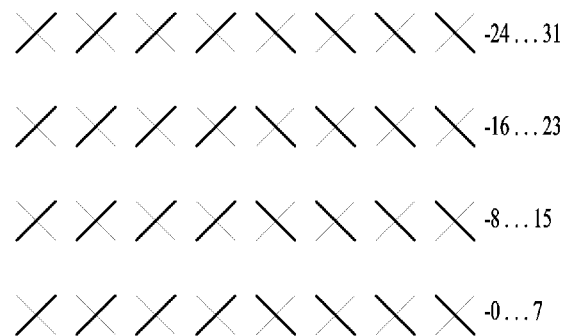
Figure 23D:
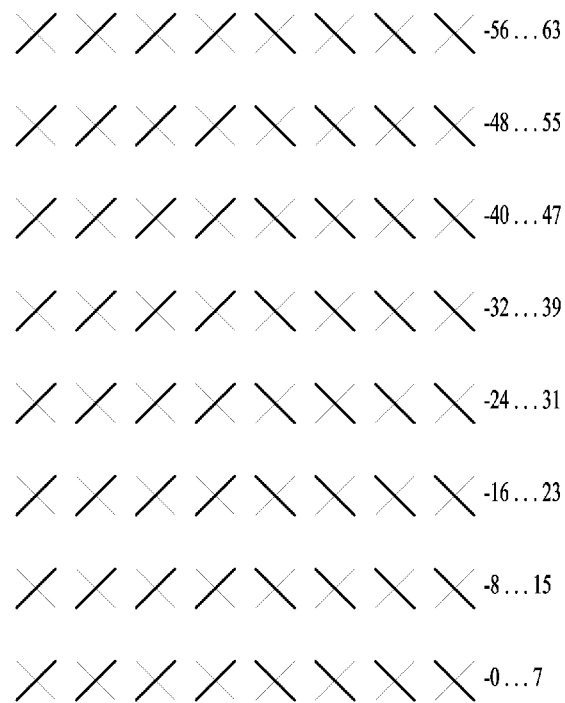

FIGS. 23B to 23D illustrate the case in which a correlation of {parameter of all antennas and parameter of vertical domain antenna ports} is {16Tx, 2}, {32Tx, 4}, and {64Tx, 8}. In FIG. 23A, as described above, the antenna array includes a cross-pole pair, and thus cross-pole antenna pairs included in one row may be configured to have poles orthogonal to each other.

Furthermore, the fifth embodiment may be configured in such a way that the aforementioned new transmission mode and transmission scheme, a CSI reporting mode, and an RRM measurement method are applied only to the case in which a parameter of vertical domain antenna ports exceeds 1 (that is, 2 or more).

Figure 24:
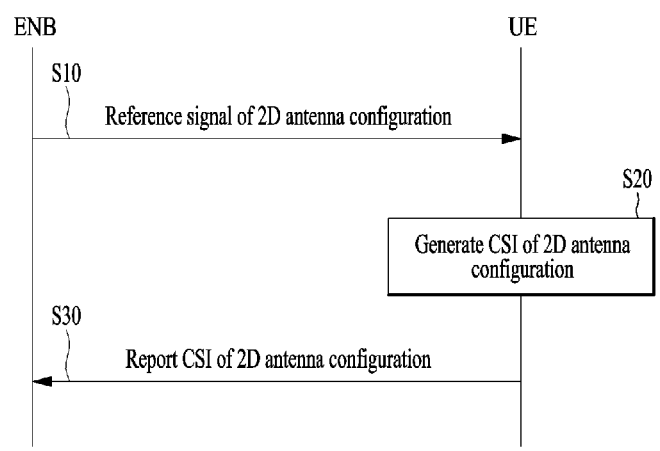
FIG. 24 is a diagram for explanation of a method for transmitting and receiving channel state information (CSI)

FIG. 24 is a diagram for explanation of a method for transmitting and receiving channel state information (CSI).

In operation S10, an eNB may transmit an RS (e.g., CSI-RS) to be used to generate CSI for a 2D antenna configuration to a UE.

In operation S20, the UE may generate the CSI for the 2D antenna configuration using the RS received from the eNB.

In operation S30, the UE may report the generated CSI to the eNB.

When the CSI for the 2D antenna configuration is generated and/or reported, a combination of one or two or more of various examples (e.g., a method for configuring a precoding matrix for representing vertical/horizontal beamforming appropriate for the 2D antenna configuration, a method for designing a codebook, a method for configuring a precoding matrix indicator, a method for reporting a precoding matrix indicator, and a method for supporting an object of a legacy system) proposed by the present invention may be applied.

Although the exemplified method described with reference to FIG. 24 is represented as including a series of operations for simplification of description, the method of FIG. 24 is not limited to an order for performing operations, and thus as necessary, the operations may be performed simultaneously or in a different order. In addition, in order to embody the method proposed by the present invention, all operations illustrated in FIG. 24 are not required.

Figure 25:
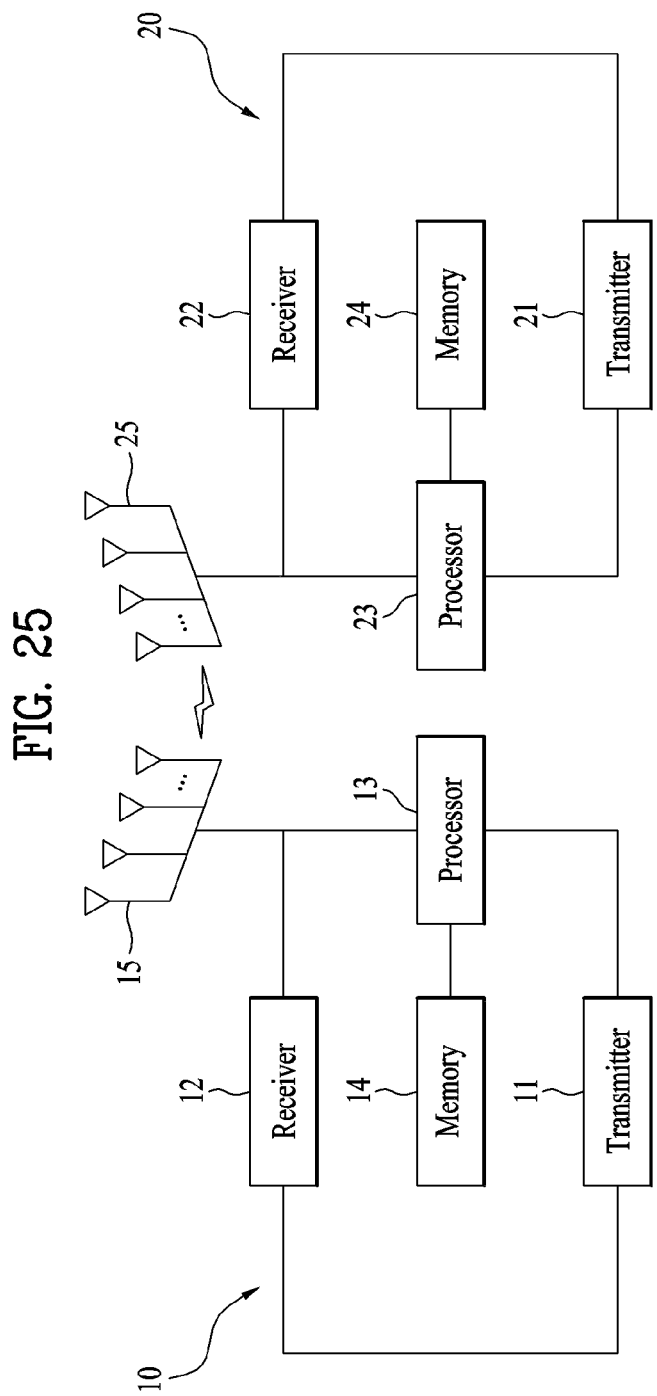
FIG. 25 is a diagram illustrating a configuration of a UE apparatus and a BS apparatus according to an embodiment of the present invention.

FIG. 25 is a diagram illustrating a configuration of a UE apparatus 20 and a BS apparatus 10 according to an embodiment of the present invention.

Referring to FIG. 25, the BS apparatus 10 according to the present invention may include a transmitter 11, a receiver 12, a processor 13, a memory 14, and a plurality of antennas 15. The transmitter 11 may transmit various signals, data, and information to an external device (e.g., a UE). The receiver 12 may receive various signals, data, and information from an external device (e.g., a UE). The processor 13 may control an overall operation of the BS apparatus 10. The plurality of antennas 15 may be configured according to a 2D antenna configuration.

The processor 13 of the BS apparatus 10 according to an embodiment of the present invention may be configured to control the transmitter 11 to transmit an RS to a UE and to control the receiver 12 to receive CSI generated by the UE using the RS from the UE.

For a detailed configuration of the BS apparatus 10, when the CSI for the 2D antenna configuration is generated and/or reported, a combination of one or two or more of various examples (e.g., a method for configuring a precoding matrix for representing vertical/horizontal beamforming appropriate for the 2D antenna configuration, a method for designing a codebook, a method for configuring a precoding matrix indicator, a method for reporting a precoding matrix indicator, and a method for supporting an object of a legacy system) proposed by the present invention may be applied.

In addition, the processor 13 of the BS apparatus 10 may perform a function for calculating information received by the BS apparatus 10 and information to be externally transmitted, and the memory 14 may store the calculated and processed information for a predetermined time period and may be replaced with a component such as a buffer (not shown).

Referring to FIG. 25, the UE apparatus 20 according to the present invention may include a transmitter 21, a receiver 22, a processor 23, a memory 24, and a plurality of antennas 25. The plurality of antennas 25 may be interpreted as a UE apparatus for supporting MIMO transmission and reception. The transmitter 21 may transmit various signals, data, and information to an external device (e.g., an eNB). The receiver 22 may receive various signals, data, and information from an external device (e.g., an eNB). The processor 23 may control an overall operation of the UE apparatus 20.

The processor 23 of the UE apparatus 20 according to an embodiment of the present invention may control the receiver 22 to receive an RS from an eNB and control the transmitter 21 to report the generated CSI to the eNB using the RS.

For a detailed configuration of the UE apparatus 20, when the CSI for the 2D antenna configuration is generated and/or reported, a combination of one or two or more of various examples (e.g., a method for configuring a precoding matrix for representing vertical/horizontal beamforming appropriate for the 2D antenna configuration, a method for designing a codebook, a method for configuring a precoding matrix indicator, a method for reporting a precoding matrix indicator, and a method for supporting an object of a legacy system) proposed by the present invention may be applied.

In addition, the processor 23 of the UE apparatus 20 may perform a function for calculating information received by the UE apparatus 20 and information to be externally transmitted, and the memory 24 may store the calculated and processed information for a predetermined time period and may be replaced with a component such as a buffer (not shown).

With regard to explanation of various embodiments of the present invention, although a DL transmission entity or a UL reception entity has been mainly described in terms of an eNB and a DL reception entity or a UL transmission entity has been mainly described in terms of a UE, the scope of the present invention is not limited thereto. For example, the description of the eNB may also be applied in the same way to the case in which a cell, an antenna port, an antenna port group, an RRH, a transmission point, a reception point, an access point, a relay, or the like is a DL transmission entity toward a UE or a UL reception entity from the UE. In addition, the principle of the present invention described with regard to the various embodiments of the present invention may also be applied in the same way to the case in which a relay is a DL transmission entity to a UE or a UL reception entity from the UE or the relay is a UL transmission entity to eNB or a DL reception entity from the eNB.

The above-described embodiments of the present invention may be achieved by various means, for example, hardware, firmware, software, or a combination thereof.

In a hardware configuration, methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing functions or operations as set forth herein. Software code may be stored in a memory unit and executed by a processor. The memory unit is located inside or outside the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. For example, an embodiment of the present invention may be constructed by combining components or configurations of the above-described embodiments of the present invention. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. In addition, it will be obvious to those skilled in the art that claims that do not explicitly cite in each other in the appended claims may be presented in combination as an exemplary embodiment of the present invention or included as a new claim by subsequent amendment after the application is filed.

INDUSTRIAL APPLICABILITY

The aforementioned embodiments of the present invention may be applied to various mobile communication systems.

What is claimed is:

1. A method for reporting channel state information (CSI) by a user equipment (UE) in a wireless communication system, the method comprising:
    receiving a channel state information-reference signal (CSI-RS) configuration including a parameter indicating the number of antenna ports per polarization in a plurality of dimensions and an indicator for a MIMO (multiple-input multiple-output) related with elevation beamforming;
    configuring a plurality of antenna ports based on the CSI-RS configuration, when the UE is configured for the MIMO related with elevation beamforming; and
    reporting the CSI in response to a reference signal received via the number of antenna ports, wherein the CSI is applied a subset of a codebook according to the plurality of antenna ports and the parameter, and
    wherein the subset of the codebook is indicated by the indicator for the MIMO related with elevation beamforming.

2. The method according to claim 1, wherein the number of the plurality of antenna ports is 8 or more.

3. The method according to claim 1, wherein predefined horizontal domain antenna ports and an antenna port number determined by the parameter are sequentially mapped to the plurality of antenna ports.

4. The method according to claim 1, wherein the plurality of antenna ports are configured in such a way that an antenna port number is mapped to a horizontal domain antenna port and then an antenna port number is mapped to a vertical domain antenna port.

5. The method according to claim 1, wherein the plurality of antenna ports are configured in such a way that an antenna port number is completely mapped to a first pole of antenna port and then an antenna port number is mapped to a second pole of antenna port.

6. The method according to claim 5, wherein the first pole of antenna port and the second pole of antenna port are configured to be orthogonal to each other.

7. A user equipment (UE) for reporting channel state information (CSI) of a wireless communication system, the UE comprising:
    a radio frequency unit; and
    a processor,
    wherein:
    the processor is configured to
    receive a channel state information-reference signal (CSI-RS) configuration including a parameter indicating the number of antenna ports per polarization in a plurality of dimensions and an indicator for a MIMO (multiple-input multiple-output) related with elevation beamforming,
    configure a plurality of antenna ports based on the CSI-RS configuration, when the UE is configured for the MIMO related with elevation beamforming, and
    report the CSI in response to a reference signal received via the number of antenna ports, wherein the CSI is applied a subset of a codebook according to the plurality of antenna ports and the parameter, and
    wherein the subset of the codebook is indicated by the indicator for the MIMO related with elevation beamforming.

* * * * *